United States Patent
Arendt et al.

(10) Patent No.: US 9,500,179 B2
(45) Date of Patent: Nov. 22, 2016

(54) SEGMENTED WIND TURBINE BLADES WITH TRUSS CONNECTION REGIONS, AND ASSOCIATED SYSTEMS AND METHODS

(71) Applicant: Vestas Wind Systems A/S, Aarhus (DK)

(72) Inventors: Cory P. Arendt, Huntington Beach, CA (US); Myles L. Baker, Long Beach, CA (US); Rick Thomas Wright, Playa Del Rey, CA (US)

(73) Assignee: Vestas Wind Systems A/S, Aarhus (DK)

( * ) Notice: Subject to any disclaimer, the term of this patent is extended or adjusted under 35 U.S.C. 154(b) by 702 days.

(21) Appl. No.: 13/683,960

(22) Filed: Nov. 21, 2012

(65) Prior Publication Data

US 2014/0140855 A1 May 22, 2014

Related U.S. Application Data

(63) Continuation of application No. PCT/US2011/037815, filed on May 24, 2011.

(60) Provisional application No. 61/347,724, filed on May 24, 2010.

(51) Int. Cl.
F03D 1/06 (2006.01)

(52) U.S. Cl.
CPC ............ F03D 1/0675 (2013.01); *Y02E 10/721* (2013.01); *Y10T 29/49337* (2015.01)

(58) Field of Classification Search
CPC .... F03D 1/0675; F03D 1/065; F03D 1/0633; F03D 1/0683; Y02E 10/721; B64C 3/00; B64C 27/463; B64C 27/473; B64C 3/18; B64C 3/182; B64C 3/185; B64C 3/187; B64C 3/56
See application file for complete search history.

(56) References Cited

U.S. PATENT DOCUMENTS

| 1,291,678 A | 1/1919 | Kleckler |
| 1,325,499 A | 12/1919 | Rapp et al. |

(Continued)

FOREIGN PATENT DOCUMENTS

| CN | 1957178 A | 5/2007 |
| CN | 101386130 A | 3/2009 |

(Continued)

OTHER PUBLICATIONS

Weber, Friedel, "How a High-Performance Sailplane is Manufactured" DG-Flugzeugbau : Manufacturing a Sailplane, Oct. 22, 2008, 10 pages.

(Continued)

*Primary Examiner* — Richard Edgar
*Assistant Examiner* — Eldon Brockman
(74) *Attorney, Agent, or Firm* — Perkins Coie LLP

(57) ABSTRACT

Segmented wind turbine blades with truss connection regions, and associated systems and methods are disclosed. A wind turbine system in accordance with a particular embodiment includes a wind turbine with a first segment having a first position along the longitudinal axis and having a first internal load-bearing structure for which non-truss structure elements carry at least 90% of the shear loads in the first segment. The blade further includes a second segment having a second position along the longitudinal axis and having a second internal load-bearing structure for which non-truss structure elements carry at least 90% of the shear loads in the first segment. A connection region between the first and second segments includes an internal load-bearing truss structure connected between the first internal load-bearing structure and the second internal load-bearing structure.

19 Claims, 16 Drawing Sheets

(56) References Cited

U.S. PATENT DOCUMENTS

| | | | |
|---|---|---|---|
| 1,337,951 A | 4/1920 | Plym | |
| 1,388,543 A | 8/1921 | Barling | |
| 1,397,701 A | 11/1921 | Rapp et al. | |
| 1,403,444 A | 1/1922 | Rapp et al. | |
| 1,453,114 A | 4/1923 | Rapp et al. | |
| 1,517,546 A | 12/1924 | Dunham | |
| 1,555,409 A * | 9/1925 | Gilmore | B64C 3/00 236/92 R |
| 1,827,181 A * | 10/1931 | Heraclio | B64C 3/00 244/117 R |
| 1,852,622 A | 4/1932 | Milburn | |
| 1,942,148 A * | 1/1934 | Ragsdale | B64C 3/00 244/123.8 |
| 1,949,785 A | 3/1934 | Cierva et al. | |
| 2,116,953 A | 5/1938 | Sambraus | |
| 2,386,019 A | 10/1945 | Watter | |
| 2,405,917 A * | 8/1946 | Watter | B64C 3/187 52/693 |
| 3,647,318 A | 3/1972 | Pehrsson et al. | |
| 4,295,790 A | 10/1981 | Eggert, Jr. | |
| 4,339,230 A | 7/1982 | Hill | |
| 4,389,162 A | 6/1983 | Doellinger et al. | |
| 4,412,784 A | 11/1983 | Wackerle et al. | |
| 5,375,324 A | 12/1994 | Wallace et al. | |
| 5,439,353 A | 8/1995 | Cook et al. | |
| 5,509,783 A | 4/1996 | Jones et al. | |
| 6,237,873 B1 | 5/2001 | Amaoka et al. | |
| 6,561,459 B2 | 5/2003 | Amaoka et al. | |
| 6,726,439 B2 | 4/2004 | Mikhail et al. | |
| 6,735,916 B2 | 5/2004 | Peshkam et al. | |
| 6,923,622 B1 | 8/2005 | Dehlsen | |
| 6,972,498 B2 | 12/2005 | Jamieson et al. | |
| 7,118,338 B2 * | 10/2006 | Moroz | F03D 7/0228 416/1 |
| 7,153,090 B2 | 12/2006 | DeLeonardo et al. | |
| 7,163,378 B2 | 1/2007 | Kildegaard | |
| 7,179,059 B2 | 2/2007 | Sorensen et al. | |
| 7,186,083 B2 | 3/2007 | Bayly | |
| 7,186,086 B2 | 3/2007 | Yoshida et al. | |
| 7,198,471 B2 | 4/2007 | Gunneskov et al. | |
| 7,322,798 B2 | 1/2008 | Cairo | |
| 7,351,040 B2 | 4/2008 | Livingston et al. | |
| 7,357,726 B2 | 4/2008 | Thorning | |
| 7,381,029 B2 | 6/2008 | Moroz | |
| 7,393,184 B2 | 7/2008 | Cairo | |
| 7,427,189 B2 | 9/2008 | Eyb et al. | |
| 7,438,533 B2 | 10/2008 | Eyb et al. | |
| 7,470,114 B2 | 12/2008 | Bonnet | |
| 7,494,324 B2 | 2/2009 | Hibbard | |
| 7,503,752 B2 | 3/2009 | Gunneskov et al. | |
| 7,517,198 B2 * | 4/2009 | Baker | F03D 1/0675 416/227 R |
| 7,521,105 B2 | 4/2009 | Bech et al. | |
| 7,581,926 B1 | 9/2009 | Dehlsen et al. | |
| 7,582,977 B1 | 9/2009 | Dehlsen | |
| 7,654,799 B2 | 2/2010 | Eyb | |
| 7,690,895 B2 | 4/2010 | Moroz | |
| 7,726,962 B2 | 6/2010 | Aramburu et al. | |
| 7,729,100 B2 | 6/2010 | Llorente Gonzalez et al. | |
| 7,731,882 B2 | 6/2010 | Bech et al. | |
| 7,740,453 B2 | 6/2010 | Zirin et al. | |
| 7,811,063 B2 | 10/2010 | Bonnet | |
| 7,883,321 B2 | 2/2011 | Bertelsen | |
| 7,891,947 B2 | 2/2011 | Chen et al. | |
| 7,891,948 B2 * | 2/2011 | Baker | F03D 1/0675 244/123.4 |
| 7,891,949 B2 * | 2/2011 | Baker | F03D 1/0675 244/123.4 |
| 7,891,950 B2 * | 2/2011 | Baker | F03D 1/0675 244/123.4 |
| 7,895,746 B2 | 3/2011 | Bech et al. | |
| 7,901,188 B2 | 3/2011 | Llorente Gonzalez et al. | |
| 7,980,840 B2 | 7/2011 | Burchardt et al. | |
| 7,988,423 B2 | 8/2011 | Hancock | |
| 8,007,624 B2 | 8/2011 | Stiesdal | |
| 8,012,299 B2 | 9/2011 | Hancock | |
| 8,034,278 B2 | 10/2011 | Lopez | |
| 8,043,065 B2 | 10/2011 | Kyriakides | |
| 8,079,818 B2 | 12/2011 | Burchardt et al. | |
| 8,105,045 B2 | 1/2012 | Stewart | |
| 8,128,854 B2 | 3/2012 | Bech et al. | |
| 8,142,157 B2 | 3/2012 | Kita et al. | |
| 8,142,164 B2 | 3/2012 | Rao et al. | |
| 8,157,939 B2 | 4/2012 | Stiesdal | |
| 8,171,633 B2 | 5/2012 | Zirin et al. | |
| 8,177,514 B2 | 5/2012 | Hibbard | |
| 8,177,515 B2 | 5/2012 | Hibbard | |
| 8,191,255 B2 | 6/2012 | Kristensen et al. | |
| 8,192,170 B2 | 6/2012 | Rohden | |
| 8,206,531 B2 | 6/2012 | Portoles | |
| 8,221,085 B2 * | 7/2012 | Livingston | B29C 65/54 156/291 |
| 8,226,866 B2 | 7/2012 | Arelt | |
| 8,382,440 B2 * | 2/2013 | Baker | F03D 1/0675 416/226 |
| 8,475,133 B2 * | 7/2013 | Baker | F03D 1/0675 416/226 |
| 8,480,370 B2 * | 7/2013 | Baker | F03D 1/0675 416/226 |
| 8,500,408 B2 * | 8/2013 | Baker | F03D 1/0675 416/226 |
| 8,500,409 B2 * | 8/2013 | Baker | F03D 1/0675 416/226 |
| 8,506,258 B2 * | 8/2013 | Baker | F03D 1/0675 416/226 |
| 2006/0045743 A1 | 3/2006 | Bertolotti et al. | |
| 2006/0083907 A1 | 4/2006 | Bech et al. | |
| 2006/0127222 A1 | 6/2006 | Arelt | |
| 2006/0225278 A1 | 10/2006 | Lin et al. | |
| 2006/0247901 A1 | 11/2006 | Thorning | |
| 2007/0036659 A1 | 2/2007 | Hibbard | |
| 2007/0107220 A1 | 5/2007 | Bakhuis et al. | |
| 2007/0217918 A1 * | 9/2007 | Baker | F03D 1/0675 416/227 R |
| 2007/0251090 A1 | 11/2007 | Breugel et al. | |
| 2008/0145231 A1 | 6/2008 | Llorente Gonzales et al. | |
| 2008/0145615 A1 | 6/2008 | Jacobsen et al. | |
| 2008/0181781 A1 | 7/2008 | Livingston et al. | |
| 2008/0206062 A1 | 8/2008 | Sanz Pascual et al. | |
| 2008/0277053 A1 | 11/2008 | Stiesdal | |
| 2009/0035517 A1 | 2/2009 | Bech | |
| 2009/0068017 A1 | 3/2009 | Rudling | |
| 2009/0120830 A1 | 5/2009 | Livingston | |
| 2009/0140527 A1 | 6/2009 | Pawar et al. | |
| 2009/0148300 A1 | 6/2009 | Driver et al. | |
| 2009/0155084 A1 * | 6/2009 | Livingston | B29C 65/54 416/223 R |
| 2009/0162206 A1 | 6/2009 | Zirin et al. | |
| 2009/0191063 A1 * | 7/2009 | Baker | F03D 1/0675 416/227 R |
| 2009/0196756 A1 | 8/2009 | Althoff | |
| 2009/0196757 A1 | 8/2009 | Baker et al. | |
| 2009/0208341 A1 | 8/2009 | Llorente Gonzalez et al. | |
| 2009/0246033 A1 | 10/2009 | Rudling | |
| 2009/0304507 A1 | 12/2009 | Dehlsen | |
| 2009/0317585 A1 | 12/2009 | Bech | |
| 2010/0028161 A1 | 2/2010 | Vronsky et al. | |
| 2010/0062238 A1 | 3/2010 | Doyle et al. | |
| 2010/0068065 A1 | 3/2010 | Jensen | |
| 2010/0071209 A1 | 3/2010 | Moller | |
| 2010/0090472 A1 | 4/2010 | Berthelsen | |
| 2010/0122442 A1 | 5/2010 | Kirkpatrick et al. | |
| 2010/0135818 A1 | 6/2010 | Babu et al. | |
| 2010/0136278 A1 | 6/2010 | Cadd et al. | |
| 2010/0143145 A1 | 6/2010 | Jones | |
| 2010/0158694 A1 | 6/2010 | Stam et al. | |
| 2010/0166998 A1 | 7/2010 | Bannister et al. | |
| 2010/0226775 A1 | 9/2010 | Hartman | |
| 2010/0239426 A1 | 9/2010 | Westergaard | |
| 2010/0260611 A1 | 10/2010 | Rudling | |
| 2010/0260612 A1 | 10/2010 | Vasudeva et al. | |
| 2010/0272570 A1 | 10/2010 | Arocena De La Rua et al. | |
| 2010/0303631 A1 | 12/2010 | Payne et al. | |
| 2010/0310379 A1 | 12/2010 | Livingston | |

(56) References Cited

U.S. PATENT DOCUMENTS

| | | |
|---|---|---|
| 2010/0314028 A1 | 12/2010 | Hedges et al. |
| 2011/0020126 A1 | 1/2011 | Glenn et al. |
| 2011/0020131 A1 | 1/2011 | Petersen et al. |
| 2011/0031758 A1 | 2/2011 | Mitsuoka et al. |
| 2011/0031759 A1 | 2/2011 | Mitsuoka et al. |
| 2011/0037190 A1 | 2/2011 | Stiesdal |
| 2011/0044820 A1 | 2/2011 | Stenbaek Nielsen et al. |
| 2011/0049770 A1 | 3/2011 | Stiesdal |
| 2011/0052403 A1* | 3/2011 | Kawasetsu ............ F03D 1/0675 416/226 |
| 2011/0073237 A1 | 3/2011 | Rajasingam |
| 2011/0084496 A1 | 4/2011 | Kuroiwa |
| 2011/0091326 A1 | 4/2011 | Hancock |
| 2011/0091684 A1 | 4/2011 | Holloway |
| 2011/0097211 A1 | 4/2011 | Rudling |
| 2011/0103962 A1 | 5/2011 | Hayden et al. |
| 2011/0103964 A1 | 5/2011 | Bech |
| 2011/0114252 A1 | 5/2011 | Partington et al. |
| 2011/0135485 A1 | 6/2011 | Wang |
| 2011/0142663 A1 | 6/2011 | Gill |
| 2011/0146896 A1 | 6/2011 | Schibsbye |
| 2011/0158788 A1* | 6/2011 | Bech ..................... F03D 1/0675 415/1 |
| 2011/0171034 A1 | 7/2011 | Whiter |
| 2011/0200444 A1 | 8/2011 | Garcia |
| 2011/0229336 A1 | 9/2011 | Richter et al. |
| 2011/0243750 A1 | 10/2011 | Gruhn et al. |
| 2012/0067515 A1 | 3/2012 | Dahl et al. |
| 2012/0082547 A1* | 4/2012 | Baker ................... F03D 1/0675 416/1 |
| 2012/0082554 A1* | 4/2012 | Baker ................... F03D 1/0675 416/226 |
| 2012/0082555 A1* | 4/2012 | Baker ................... F03D 1/0675 416/233 |
| 2012/0082557 A1* | 4/2012 | Baker ................... F03D 1/0675 416/241 R |
| 2012/0082558 A1* | 4/2012 | Baker ................... F03D 1/0675 416/241 R |
| 2012/0195765 A1* | 8/2012 | Baker ................... F03D 1/0675 416/226 |
| 2012/0211637 A1 | 8/2012 | Christiansen et al. |
| 2014/0154091 A1* | 6/2014 | Baker ................... F03D 1/0675 416/226 |

FOREIGN PATENT DOCUMENTS

| | | |
|---|---|---|
| CN | 101463794 A | 6/2009 |
| DE | 102009040515 A1 | 3/2011 |
| EP | 1184566 A1 | 3/2002 |
| EP | 1584817 | 10/2005 |
| EP | 1806285 | 7/2007 |
| EP | 1878915 | 1/2008 |
| EP | 1965074 A2 | 9/2008 |
| FR | 2588822 | 4/1987 |
| GB | 382979 | 11/1932 |
| GB | 448249 | 6/1936 |
| GB | 582527 A | 11/1946 |
| GB | 2477847 A | 8/2011 |
| JP | 2005299620 | 10/2005 |
| WO | WO-2004050337 A1 | 6/2004 |
| WO | WO-2004078461 A1 | 9/2004 |
| WO | WO-2005064156 | 7/2005 |
| WO | WO-2006002621 | 1/2006 |
| WO | WO-2006005944 | 1/2006 |
| WO | WO-2006016089 A1 | 2/2006 |
| WO | WO-2006061617 | 6/2006 |
| WO | WO-2006082479 A1 | 8/2006 |
| WO | WO-2006128940 | 12/2006 |
| WO | WO-2007045244 | 4/2007 |
| WO | WO-2009059604 A1 | 5/2009 |
| WO | WO-2010023299 A2 | 3/2010 |
| WO | WO-2010135737 A1 | 11/2010 |
| WO | WO-2010136432 A1 | 12/2010 |
| WO | WO-2011117546 A1 | 9/2011 |

OTHER PUBLICATIONS

International Search Report and Written Opinion for International Patent Application No. PCT/US2011/037815, mailed Dec. 22, 2011, 11 pages.

"Wind Turbine Design;" Wikipedia, the free encyclopedia; <http://en.wikipedia.org/wiki/Wind_turbine_design> [accessed: Mar. 9, 2007}; pp. 1-8.

"Wind Turbine;" Wikipedia, the free encyclopedia; <http://en.wikipedia.org/wiki/Wind_turbine> [accessed: Mar. 9, 2007}; pp. 1-11.

* cited by examiner

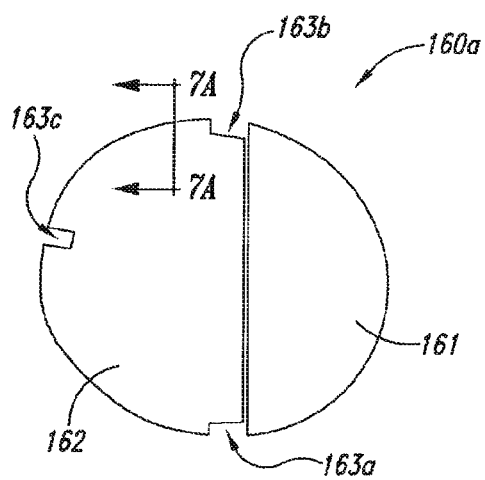
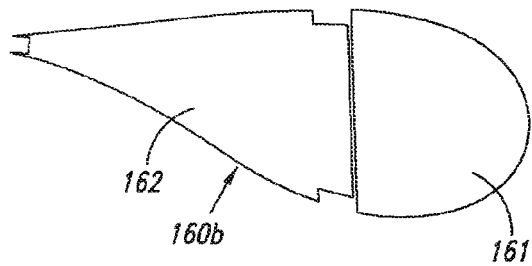
Fig. 6A   Fig. 6B
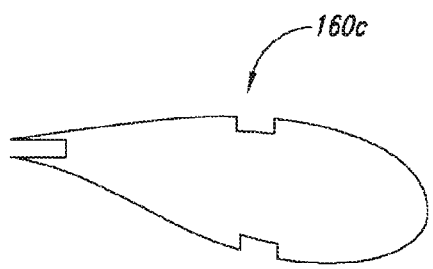
Fig. 6C
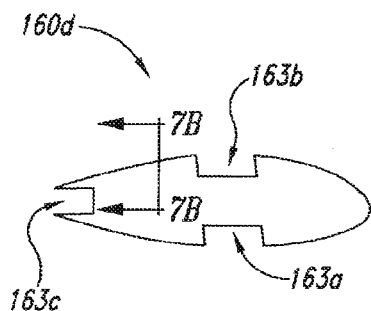
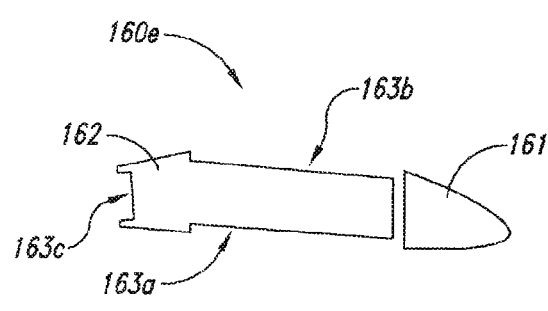
Fig. 6D   Fig. 6E

SEGMENTED WIND TURBINE BLADES WITH TRUSS CONNECTION REGIONS, AND ASSOCIATED SYSTEMS AND METHODS

CROSS-REFERENCE TO RELATED APPLICATION

The present application is a continuation of International Patent Application No. PCT/US2011/037815, filed May 24, 2011, entitled "SEGMENTED WIND TURBINE BLADES WITH TRUSS CONNECTION REGIONS, AND ASSOCIATED SYSTEMS AND METHODS," which claims priority to U.S. Provisional Application 61/347,724, filed May 24, 2010 and incorporated herein by reference.

TECHNICAL FIELD

The present disclosure is directed generally to segmented wind turbine blades with truss connection regions, and associated systems and methods.

BACKGROUND

As fossil fuels become scarcer and more expensive to extract and process, energy producers and users are becoming increasingly interested in other forms of energy. One such energy form that has recently seen a resurgence is wind energy. Wind energy is typically harvested by placing a multitude of wind turbines in geographical areas that tend to experience steady, moderate winds. Modern wind turbines typically include an electric generator connected to one or more wind-driven turbine blades, which rotate about a vertical axis or a horizontal axis.

In general, larger (e.g., longer) wind turbine blades produce energy more efficiently than do short blades. Accordingly, there is a desire in the wind turbine blade industry to make blades as long as possible. However, long blades create several challenges. For example, long blades are heavy and therefore have a significant amount of inertia, which can reduce the efficiency with which the blades produce energy, particularly at low wind conditions. In addition, long blades are difficult to manufacture and in many cases are also difficult to transport. Accordingly, a need remains for large, efficient, lightweight wind turbine blades, and suitable methods for transporting and assembling such blades.

BRIEF DESCRIPTION OF THE DRAWINGS

FIGS. 6A-6E illustrate ribs located at representative points along the span of a wind turbine blade and configured in accordance with embodiments of the disclosure.

DETAILED DESCRIPTION

The present disclosure is directed generally to efficient wind turbine blades, including segmented wind turbine blades connected with truss connection regions, and associated systems and methods of manufacture, assembly, and use. Several details describing structures and/or processes that are well-known and often associated with wind turbine blades are not set forth in the following description to avoid unnecessarily obscuring the description of the various embodiments of the disclosure. Moreover, although the following disclosure sets forth several representative embodiments, several other embodiments can have different configurations or different components than those described in this section. In particular, other embodiments may have additional elements and/or may lack one or more of the elements described below with reference to FIGS. 1-11E. In FIGS. 1-11E, many of the elements are not drawn to scale for purposes of clarity and/or illustration. In several instances, elements referred to individually by a reference number followed by a letter (e.g., 117a, 117b, 117c) are referred to collectively and/or generically by the reference number without the letter (e.g., 117).

Figure 1:
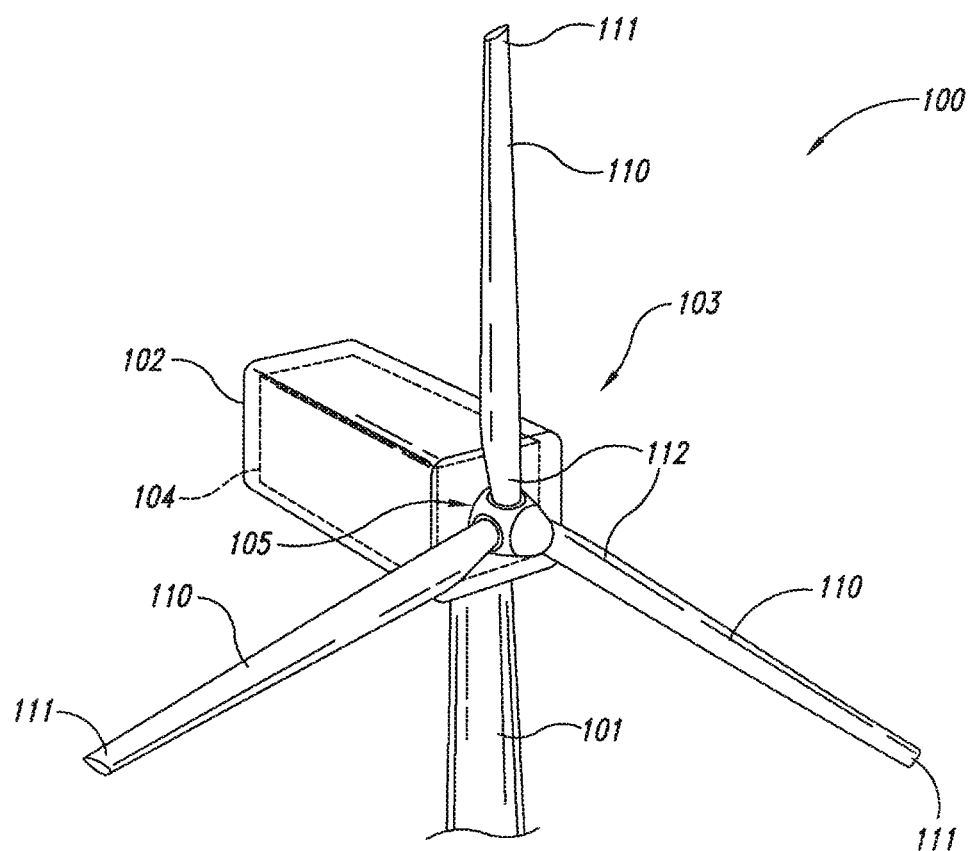
FIG. 1 is a partially schematic, isometric illustration of a wind turbine system having blades configured in accordance with an embodiment of the disclosure.

FIG. 1 is a partially schematic, isometric illustration of an overall system 100 that includes a wind turbine 103 having blades 110 configured in accordance with an embodiment of the disclosure. The wind turbine 103 includes a tower 101 (a portion of which is shown in FIG. 1), a housing or nacelle 102 carried at the top of the tower 101, and a generator 104 positioned within the housing 102. The generator 104 is connected to a shaft or spindle having a hub 105 that projects outside the housing 102. The blades 110 each include a hub attachment portion 112 at which the blades 110 are connected to the hub 105, and a tip 111 positioned radially or longitudinally outwardly from the hub 105. In an embodiment shown in FIG. 1, the wind turbine 103 includes three blades connected to a horizontally-oriented shaft. Accordingly, each blade 110 is subjected to cyclically varying loads as it rotates between the 12:00, 3:00, 6:00 and 9:00 positions, because the effect of gravity is different at each position. In other embodiments, the wind turbine 103 can include other numbers of blades connected to a horizontally-oriented shaft, or the wind turbine 103 can have a shaft with a vertical or other orientation. In any of these embodiments, the blades can have structures configured in accordance with the arrangements described in further detail below with reference to FIGS. 2-11E.

Figure 2:
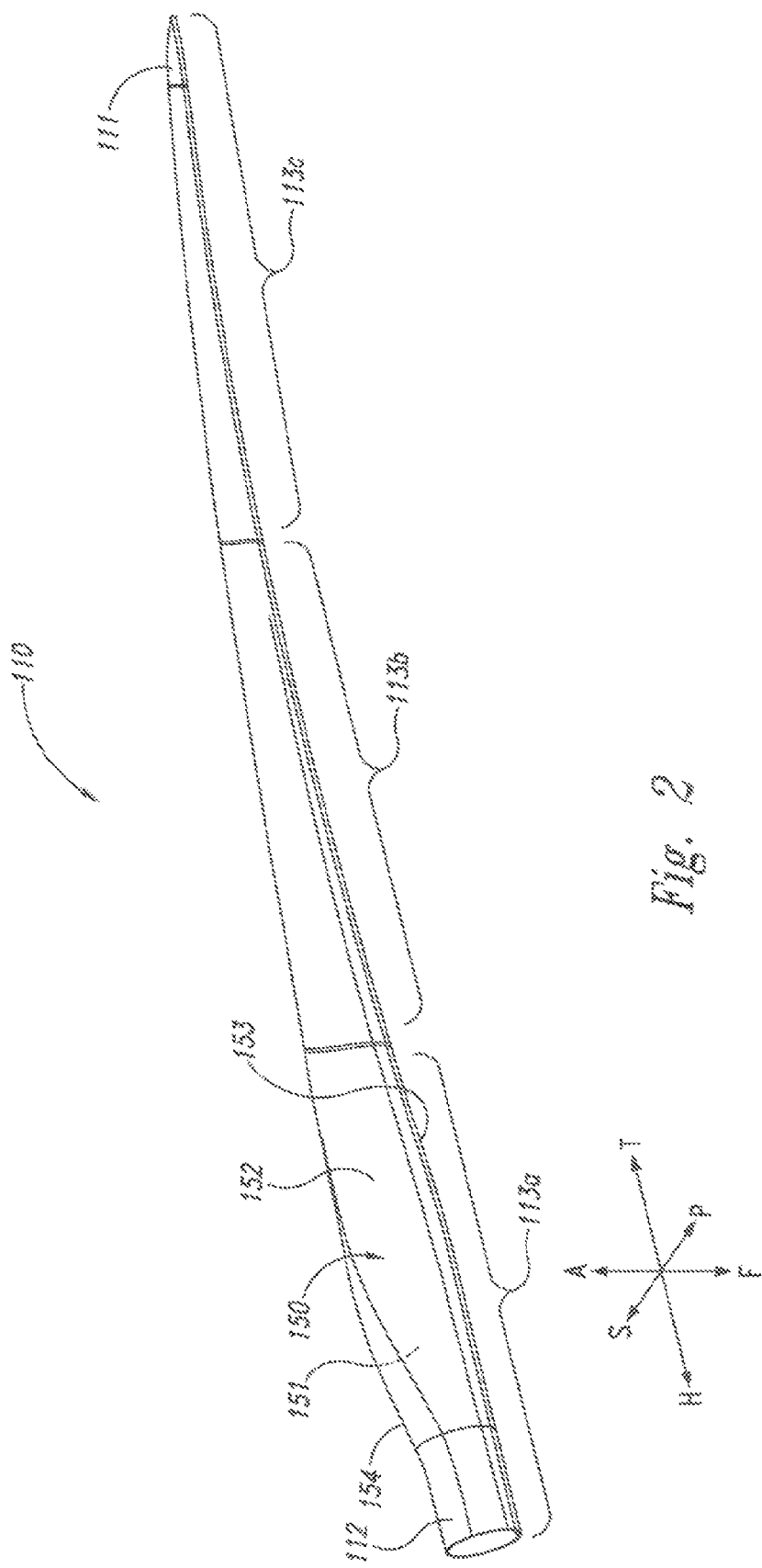
FIG. 2 is a partially schematic, isometric illustration of a wind turbine blade configured in accordance with an embodiment of the disclosure.

FIG. 2 is a partially schematic, isometric illustration of a representative one of the blades 110 described above with reference to FIG. 1. The blade 110 includes multiple segments 113, for example, a first segment 113a, a second segment 113b, and a third segment 113c. The segments extend along a spanwise or axial axis from the hub attachment portion 112 to the tip portion 111. The spanwise axis is represented in FIG. 2 as extending in a hub direction H and a tip direction T. The blade 110 also extends along a thickness axis in a pressure direction P and a suction direction S, and further extends along a chordwise axis in a forward direction F and an aft direction A. The outer surface of the blade 110 is formed by a skin 150 that can include several skin sections. These sections can include a suction side skin 151, a pressure side skin 152, a leading edge skin 153, and a trailing edge skin 154. The internal structure of the blade 110, the connections between the internal structure and the skin 150, and the connections between neighboring segments 113 are described further below with reference to FIGS. 3-11E.

Figure 3:
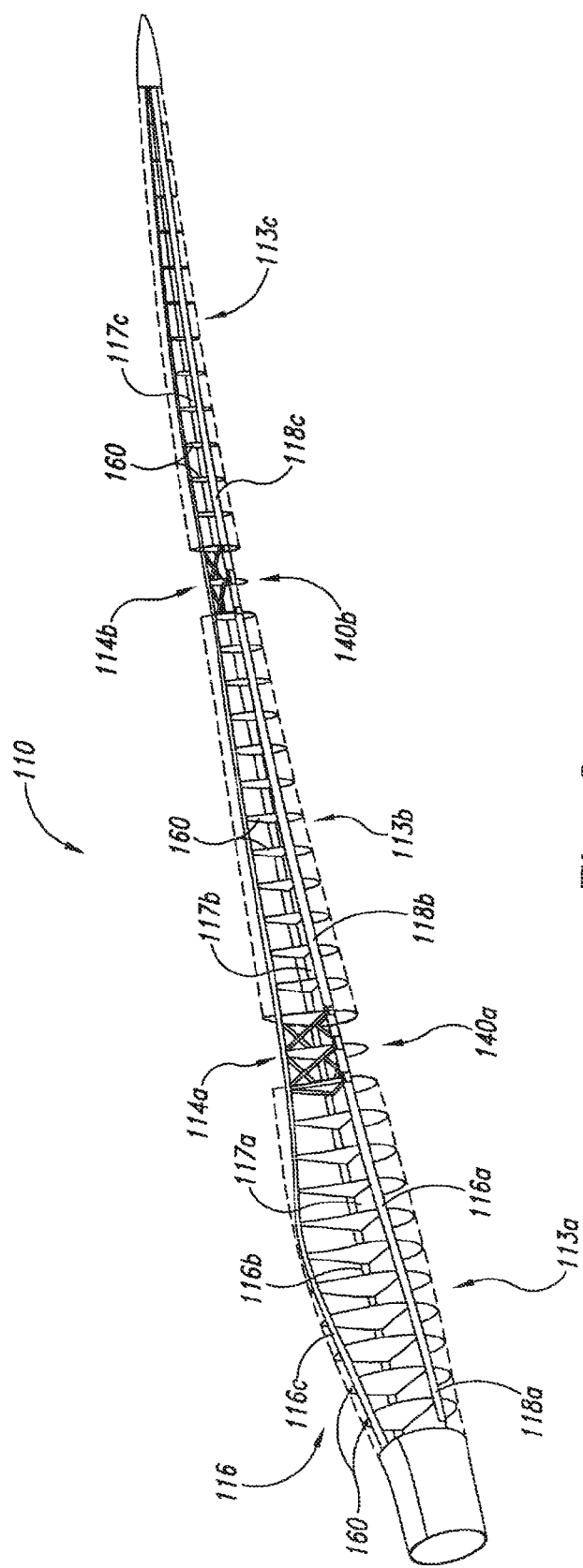
FIG. 3 is an illustration of an embodiment of the wind turbine blade shown in FIG. 2, with portions of the outer skin of the blade removed and/or translucent for purposes of illustration.

FIG. 3 illustrates the blade 110 with portions of the skin removed or translucent for purposes of illustration. In this embodiment, the blade 110 includes multiple ribs 160 located at each of the segments 113a, 113b and 113c. The ribs 160 are connected to three spars 116 (shown as a first spar 116a, a second spar 116b, and a third spar 116c) that extend along the length of the blade 110. Accordingly, each of the spars 116 includes a first spar portion 118a at the first segment 113a, a second spar portion 118b at the second segment 113b, and a third spar portion 118c at the third segment 113c. Each segment 113 also includes a corresponding shear web 117, illustrated as a first shear web 117a, a second shear web 117b, and a third shear web 117c. The spar portions 118 in neighboring sections 113 are connected at two connection regions 114a, 114b to transmit loads from one segment 113 to the next. The shear webs 117 are not continuous across the connection regions 114. Instead, truss structures 140 (shown as a first structure 140a and a second truss structure 140b) at each connection region 114 are connected between neighboring segments 113 to transmit shear loads from one segment 113 to the next.

Figure 4:
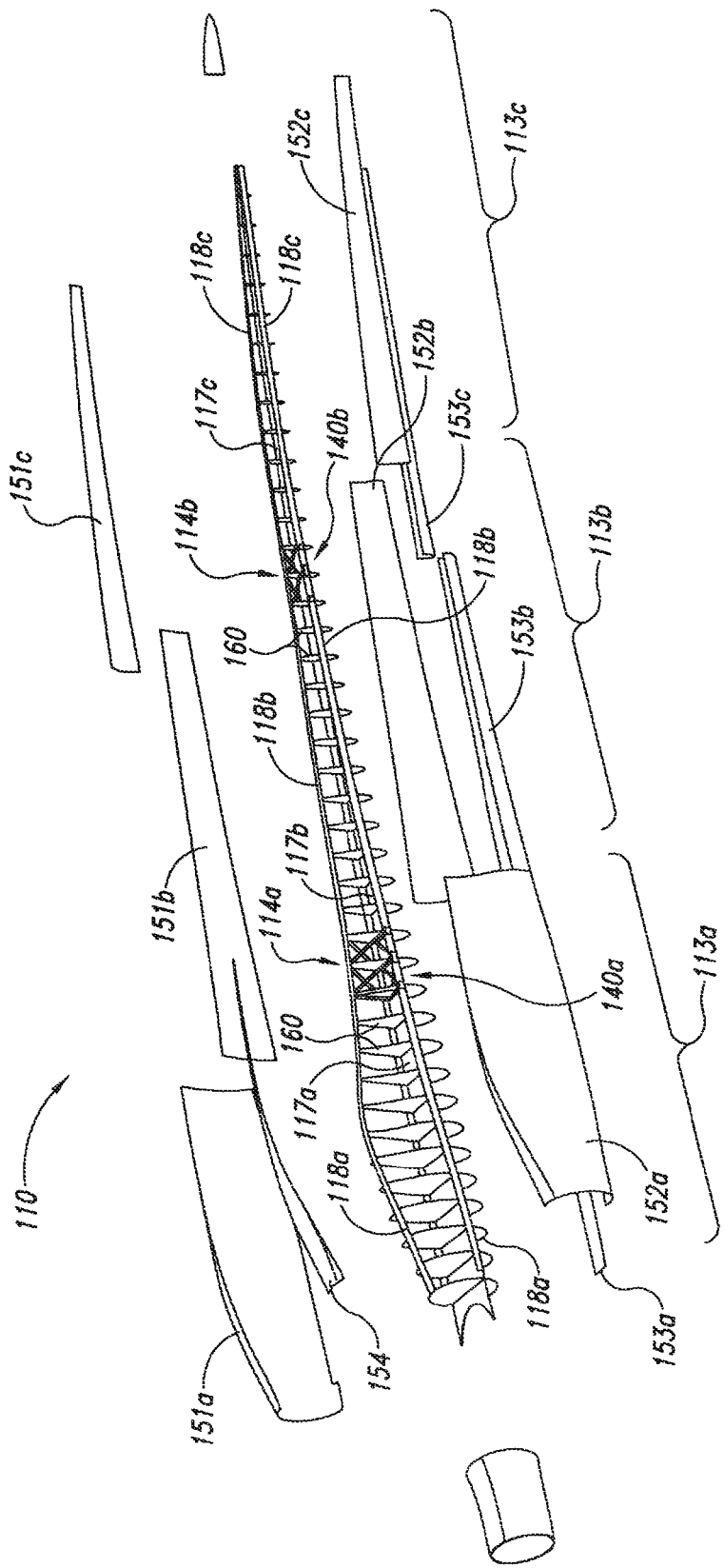
FIG. 4 is a partially exploded illustration of an embodiment of the wind turbine blade shown in FIG. 2.

FIG. 4 is a partially exploded illustration of the blade 110 shown in FIG. 3. As shown in FIG. 4, each of the blade segments 113a, 113b, 113c includes a corresponding set of skin segments. In particular, the first blade segment 113a includes a first suction side skin 151a, a first pressure side skin 152a, a first leading edge skin 153a, and a trailing edge skin 154. The trailing edge skin 154 extends only over the first segment 113a in a particular embodiment. Accordingly, the second segment 113b includes a second suction side skin 151b, a second pressure side skin 152b, and a second leading edge skin 153b. The third segment 113c includes a third suction side skin 151c, a third pressure side skin 152c, and a third leading edge skin 153c.

During assembly, the ribs 160, shear webs 117, and spar portions 118 for each of the segments 113a, 113b, 113c can be assembled at a fabrication site, and the associated skins attached to the ribs 160 and/or the spar portions 118. Each of the segments 113 can then be transported as a separate unit to a final assembly site, for example, in a manner disclosed in pending PCT Patent Application US10/35957, filed May 24, 2010 and incorporated herein by reference. At the assembly site, the neighboring segments 113 are attached using the first and second truss structures 140a, 140b located at the corresponding connection regions 114a, 114b. Further details of the truss structures 140a, 140b are described later with reference to FIGS. 8A-9B.

Figure 5:
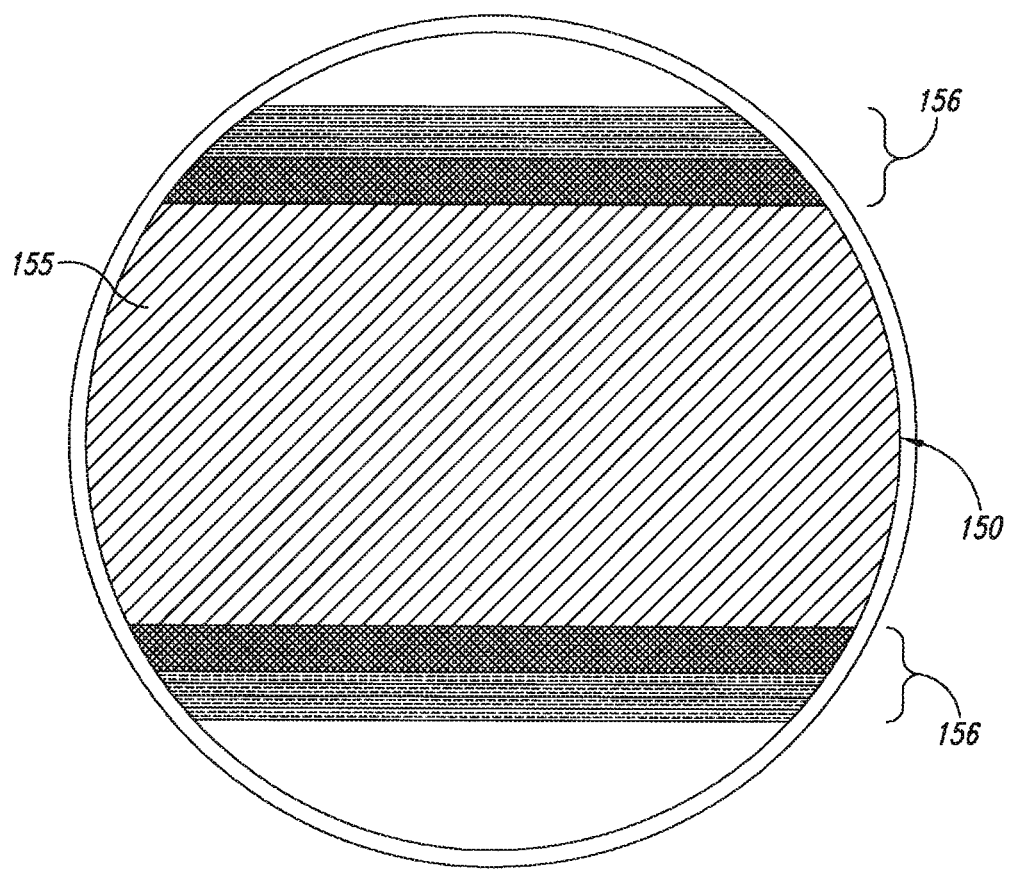
FIG. 5 is a partially schematic, cross-sectional illustration of a portion of a wind turbine blade skin constructed in accordance with an embodiment of the disclosure.

FIG. 5 is a partially schematic cross-sectional illustration of a representative section of skin 150 having a composite structure in accordance with an embodiment of the disclosure. This structure can include a core 155 (e.g., a balsa wood core sheet) and two corresponding coverings 156 attached to opposing surfaces of the core 155. In a particular embodiment, the coverings 156 can include alternating plies of fiberglass, having transverse orientations (e.g. ±45°). In other embodiments, the coverings 156 and/or the core 155 can have other compositions.

FIGS. 6A-6E illustrate five representative ribs 160 configured in accordance with embodiments of the disclosure, and arranged in a spanwise or longitudinal direction along the length of the wind turbine blade. Additional ribs are typically positioned between the illustrated ribs and/or beyond the innermost or outermost ribs, as shown in FIG. 4. FIG. 6A illustrates a first rib 160a positioned toward the hub attachment portion 112 (FIG. 4) of the blade. The first rib 160a includes a forward section 161 that provides shape and support for a corresponding leading edge skin, but does not transmit a significant portion of the loads in the blade 110. The first rib 160a can also include an aft portion 162 that transmits a more significant portion of the blade loads, and is attached directly to the spanwise extending spars 116a, 116b, 116c (FIG. 4). Accordingly, the aft portion 162 can include a first spar recess 163a that accommodates the first spar 116a, a second spar recess 163b that accommodates the second spar 116b, and a third spar recess 163c that accommodates the third spar 116c.

FIG. 6B illustrates a second rib 160b located further toward the tip of the blade, within the first segment 113a. Accordingly, the second rib 160b has a more airfoil-type shape. As noted above, intermediate ribs located between the first rib 160a and the second rib 160b are not shown in FIGS. 6A-6E.

FIG. 6C illustrates a third rib 160c that is positioned at the first connection region 114a (FIG. 4) between the first segment 113a and the second segment 113b. Because the shear web 117 is not present at the first connection region 114a, the third rib 160c does not include separate forward and aft sections, but is instead continuous in a chordwise direction.

FIG. 6D illustrates a fourth rib 160d located at the second connection region 114b (FIG. 4) between the second segment 113b and the third segment 113c. In this region, the blade has a significantly smaller cross section and accordingly, the fourth rib 160d is smaller than the first-third ribs 160a-160c, though the ribs are not drawn to scale in FIGS. 6A-6E. In addition, the spar recesses 163a-163c are larger relative to the overall size of the fourth rib 160d, and are spaced more closely together.

FIG. 6E illustrates a fifth rib 160e located near the tip of the blade. The fifth rib 160e includes a forward section 161 forward of the corresponding shear web, an aft section 162 located aft of the shear web, and spar recesses 163a-163c that accommodate the corresponding spars described above.

Figure 7A:
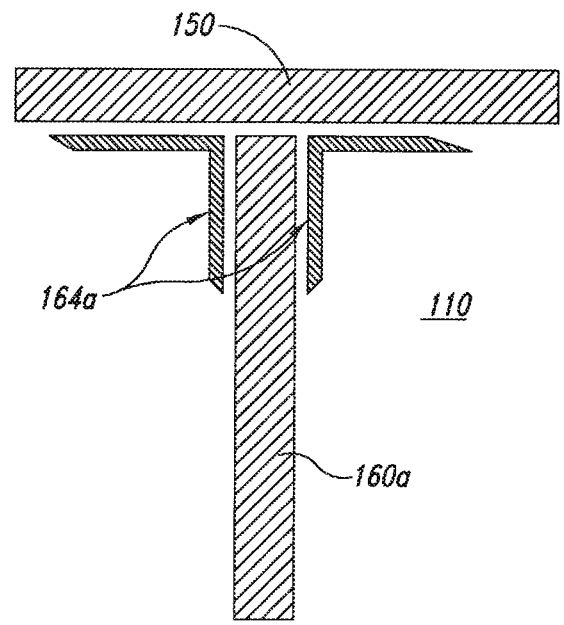
FIGS. 7A and 7B illustrate representative connections between ribs and skins of a wind turbine blade in accordance with an embodiment of the disclosure.
Figure 7B:
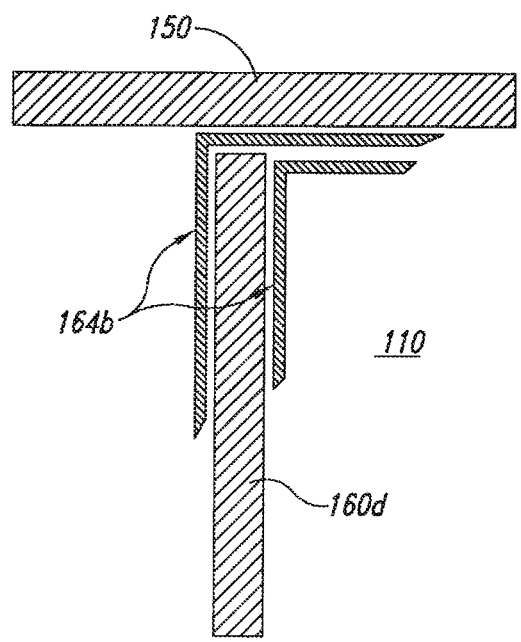

FIGS. 7A and 7B illustrate representative bonds between the ribs and skin described above. For example, FIG. 7A is a cross-sectional view of a portion of the first rib 160a, taken substantially along line 7A-7A of FIG. 6A. In this embodiment, the first rib 160a is located at a portion of the blade large enough to accommodate an installer inside. Accordingly, the installer can install first bracket-shaped bonds 164a between the skin 150 and opposing faces of the first rib 160a from a location inside the blade 110. In a particular embodiment, the first bonds 164a can include wet laminates, for example, laminates of multiple plies of fiberglass that are cured in place. In other embodiments, the first bonds 164a can have other arrangements.

FIG. 7B is a cross-sectional view of a portion of the fourth rib 160d shown in FIG. 6D, taken substantially along line 7D-7D of FIG. 6D. At this point along the span of the blade, the cross-sectional area may not be large enough to allow an installer to be located inside the blade 110 when attaching the skin. Accordingly, the installer can apply second bonds 164b prior to installing the skin 150. In the particular embodiment, the second bonds 164b can include plies of fiberglass that are laid up on the fourth rib 160d and allowed to cure, forming a hard flange. The skin 150 can then be attached from an external location by applying an adhesive to the underside of the skin 150, and then placing the skin 150 against the flange formed by the second bonds 164b.

Figure 8A:
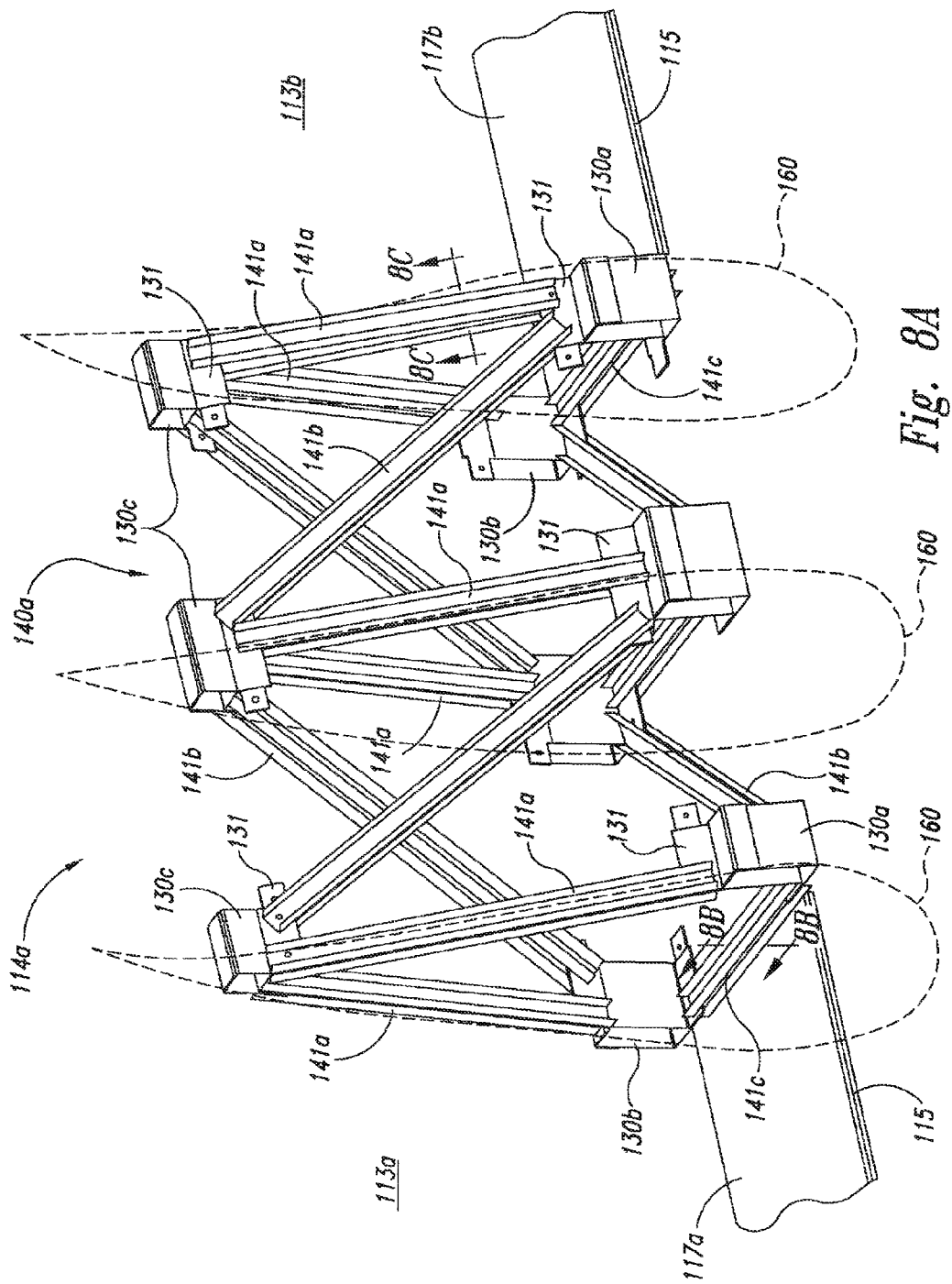
FIG. 8A is a partially schematic, isometric illustration of a first wind turbine blade connection region constructed in accordance with an embodiment of the disclosure.

FIG. 8A is a partially schematic, isometric illustration of a portion of the first truss structure 140a located at the first connection region 114a described above with reference to FIG. 3. For purposes of illustration, several of the components of the blade 110 in this region (e.g., the skins and the spars) are not shown in FIG. 8A. The first truss structure 140a provides a connection between the first segment 113a and the second segment 113b of the blade 110. Accordingly, the first truss structure 140a can include chordwise-extending first truss members 141a connected to the ribs 160. The first truss structure 140a can further include truss attachment members 130 (three are shown at each rib 160 as first truss attachment members 130a, second truss attachment members 130b, and third truss attachment members 130c) connected to the ends of the first truss members 141a, and connected to the spars (not shown in FIG. 8A). The truss attachment members 130 can include flanges 131 or other features that facilitate attachment to the truss members 141, e.g., via threaded fasteners or other fasteners. Transverse second truss members 141b can extend diagonally between truss attachment members 130 located at different ribs 160. Third truss members 141c are connected directly to the shear webs 117a, 117b so as to transmit shear loads across the connection region 114a between the second shear web 117b and the first shear web 117a. Each of the shear webs 117a, 117b can include a web support panel 115 to facilitate this load transfer, as described further below with reference to FIG. 8B.

Figure 8B:
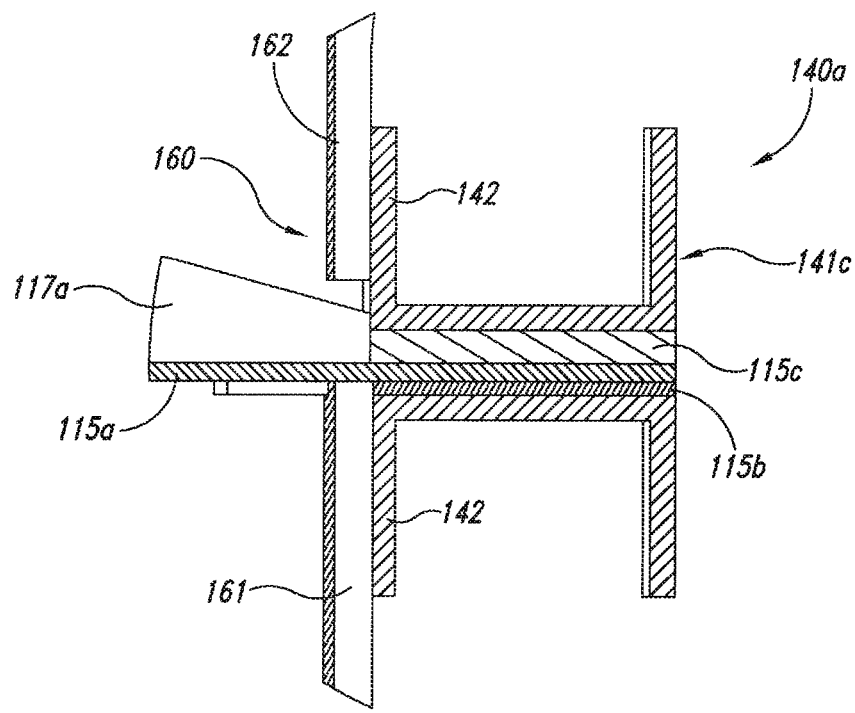
FIG. 8B is a partially schematic, cross-sectional illustration of a portion of the connection region taken substantially along line 8B-8B of FIG. 8A.

FIG. 8B is a partially schematic, cross-sectional illustration of a portion of the first truss structure 140a, taken substantially along line 8B-8B of FIG. 8A. In an embodiment shown in FIG. 8B, the third truss member 141c is formed from two C-channels 142 positioned back-to-back relative to each other. The first shear web 117a is attached to a shear web support 115a (e.g., a panel) that extends between the two C-channels 142. Additional shear web supports 115b, 115c are also located between the C-channels 142. The C-channels 142 can be attached directly to the shear web supports 115, for example, by adhesive bonding, and/or by fasteners. The C-channels 142 can also be attached via an adhesive or other suitable technique to the rib 160, e.g., the forward rib section 161 and the aft rib section 162. Accordingly, the C-channels 142 can clamp the shear web supports 115a-115c without bearing directly on the shear web 117a itself. In a particular embodiment, the shear web 117a can be formed from a composite laminate, and the shear web supports 115a, 115c can be formed from aluminum or another suitable metal. In other embodiments, these components can have other compositions.

Figure 8C:
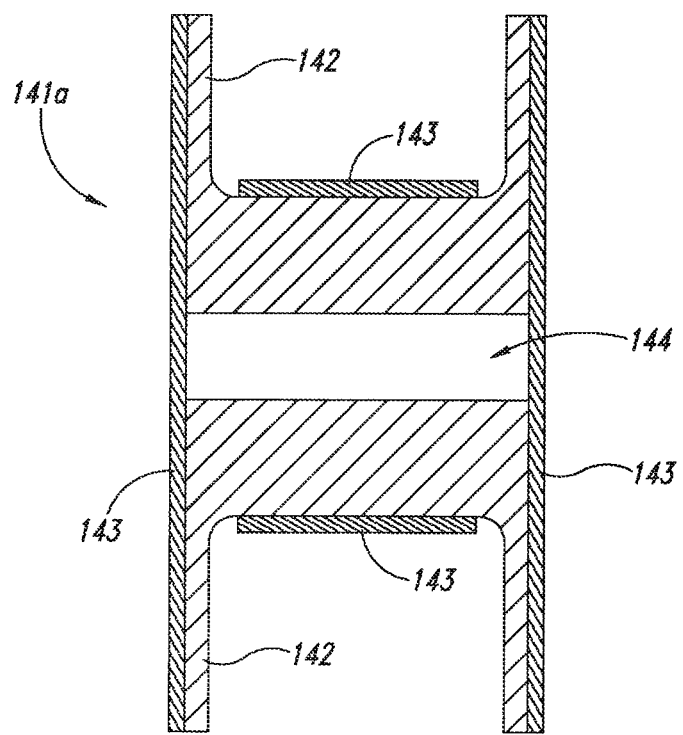
FIG. 8C is a partially schematic, cross-sectional illustration of a truss member taken substantially along line 8C-8C of FIG. 8A.

The truss members 141 located away from the shear panels 117a, 117b need not clamp the shear web supports. For example, FIG. 8C is a partially schematic, cross-sectional illustration of one of the first truss members 141a, taken substantially along line 8C-8C of FIG. 8A. In this embodiment, the first truss member 141a includes two C-channels 142 that are spaced apart by a gap 144 at locations between the truss attachment members 130a, 130c. The gap 144 results because each of the C-channels 142 is attached to opposite sides of the flanges 131 (FIG. 8A) projecting away from the corresponding truss attachment members 130a, 130c. The C-channels 142 can be reinforced with tabs 143 or other supports that enhance the rigidity of the truss member 140.

Figure 9A:
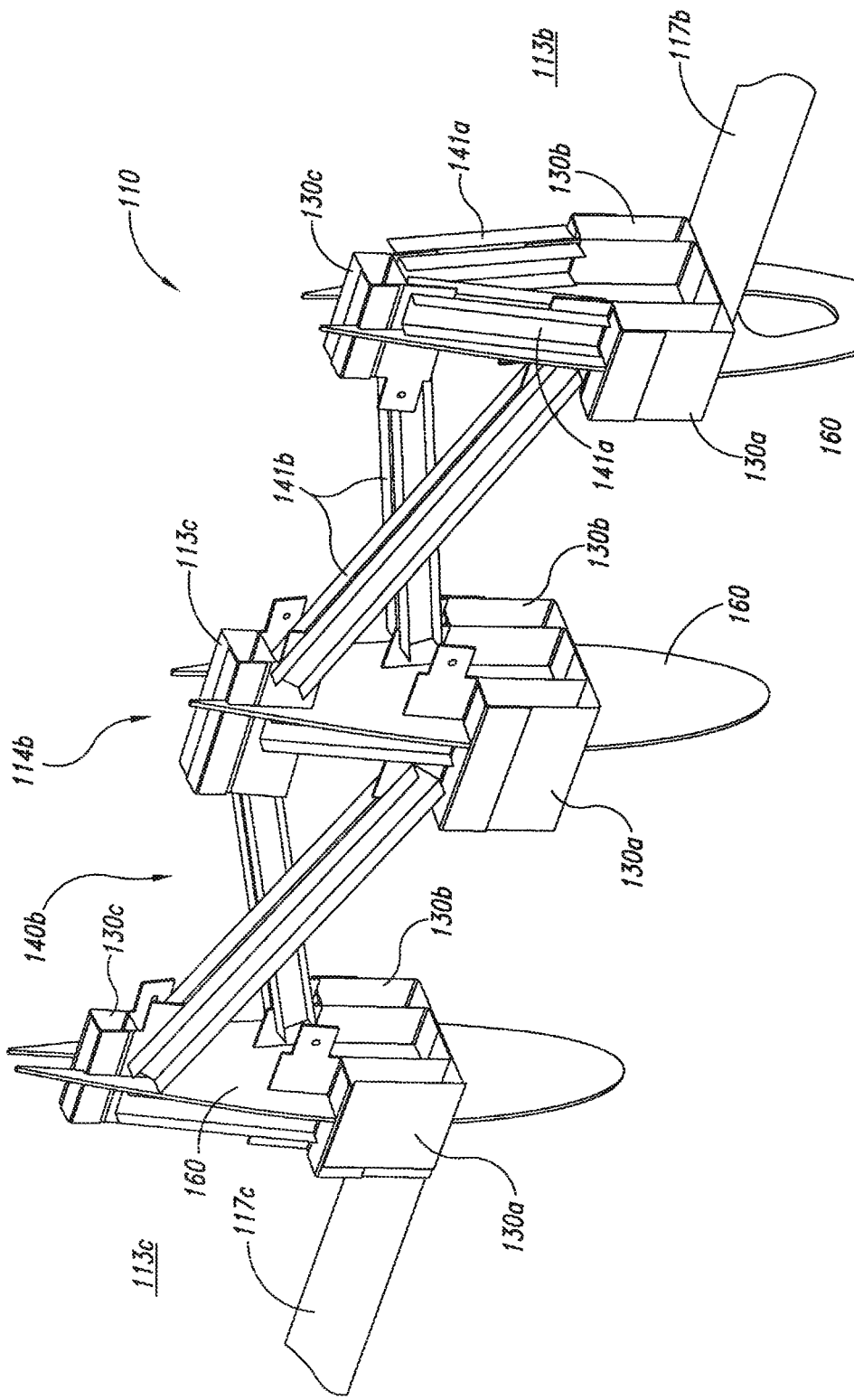
FIG. 9A is a partially schematic, isometric illustration of a second wind turbine blade connection region configured in accordance with an embodiment of the disclosure.

FIG. 9A is a partially schematic illustration of portions of the second connection region 114b located between the second blade segment 113b and the third blade segment 113c. Many aspects of the overall arrangement of the second truss structure 140b located at this region are the same as or similar to those described above with reference to the first truss structure 140a shown in FIG. 8A. Certain aspects are different. For example, the cross-section of the blade 110 is so thin at this section that opposing first and second truss attachment members 130a, 130b are close to or in direct contact with each other, eliminating the need for a second truss member 141b (FIG. 8A) extending alongside the ribs 160. The relatively small thickness of the blade in this region can also eliminate the need for at least some of the diagonally extending truss members 141 as well.

Figure 9B:
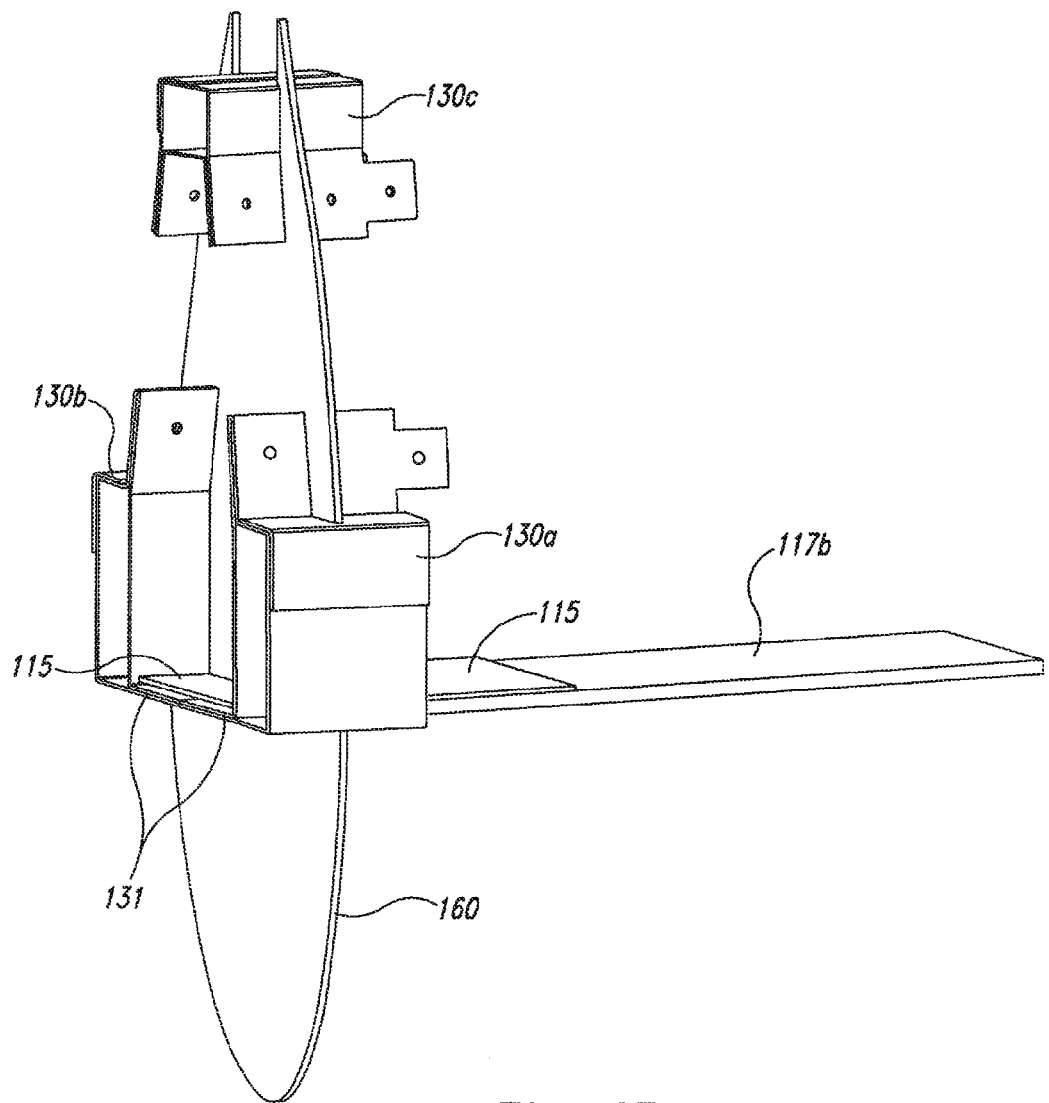
FIG. 9B is a partially schematic, isometric illustration of a portion of the connection region shown in FIG. 9A.

FIG. 9B is a partially schematic illustration of the second shear web 117b and associated rib 160, along with a portion of the second truss structure 140b, including the associated truss attachment members 130a-130c. As shown in FIG. 9B, the second shear web portion 117b includes a web support panel 115 that extends axially above the flanges 131 of the first and second truss attachment members 130a, 130b, while the shear web 117b itself terminates at the rib 160. Accordingly, the web support panel 115 transmits shear loads from the shear web 117b to the truss attachment members 130, and via the truss members 141 (FIG. 9A) to the rest of the truss structure 140.

Figure 9C:
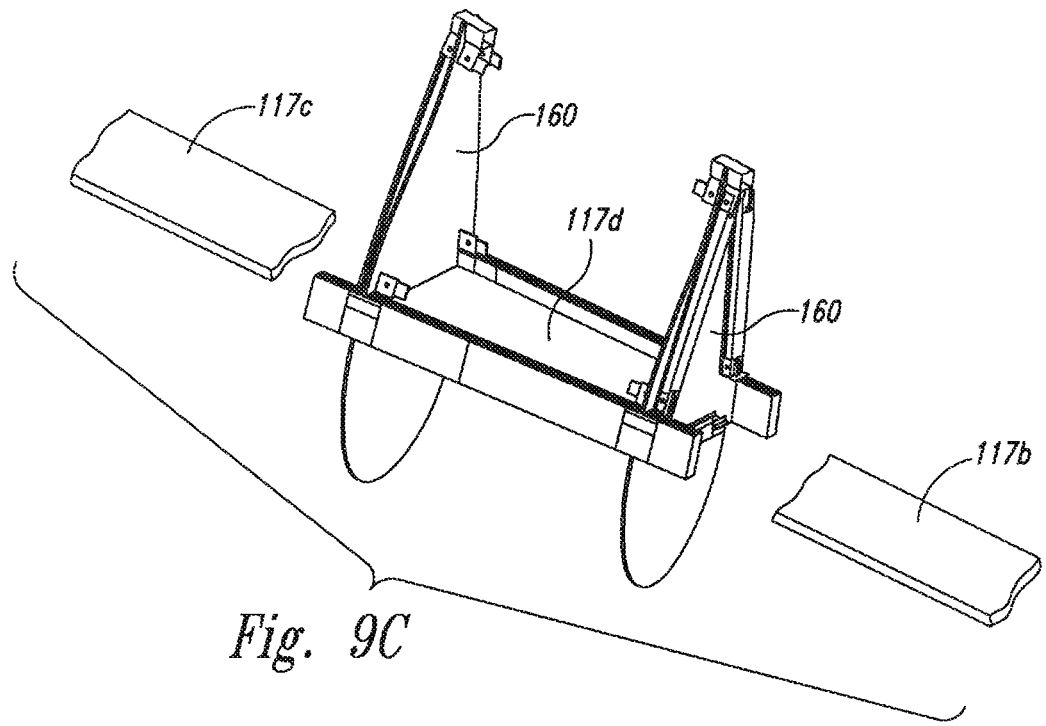
FIG. 9C is a partially schematic, isometric illustration of a portion of a connection region configured in accordance with another embodiment of the disclosure.

FIG. 9C is a partially schematic, isometric illustration of a portion of a representative second connection region 114b configured in accordance with another embodiment of the disclosure. For purposes of illustration, several features of the second connection region 114b (e.g., the truss members 141a, 141b and the additional rib 160 shown in FIG. 9A) are not shown in FIG. 9C. In one aspect of this embodiment, the second connection region 114b includes an additional, fourth shear web portion 117d located between neighboring ribs 160. The fourth shear web portion 117d can be secured in position by adhesively bonding it to the first and second spars 116a, 116b, and/or to the ribs 160 via flanges and/or other suitable structures. When the second connection region 114b includes an additional rib 160, it can also include an additional shear web portion. The second and third shear web portions 117b, 117c can be connected to the second truss structure 140b in the same manner as described above with reference to FIGS. 9A and 9B. The additional fourth shear web portion 117b can supplement the shear strength provided by the second truss structure 140b. In any of the embodiments described above with reference to FIGS. 9A-9C, the second and third shear web portions 117b, 117c are discontinuous relative to each other in the longitudinal or spanwise direction, and are generally aligned with each other in the (transverse) thickness and chordwise directions. The discontinuity between the shear web portions allows the blade segments to which they belong to be manufactured and/or shipped as separate segments and then subsequently joined.

Figure 10A:
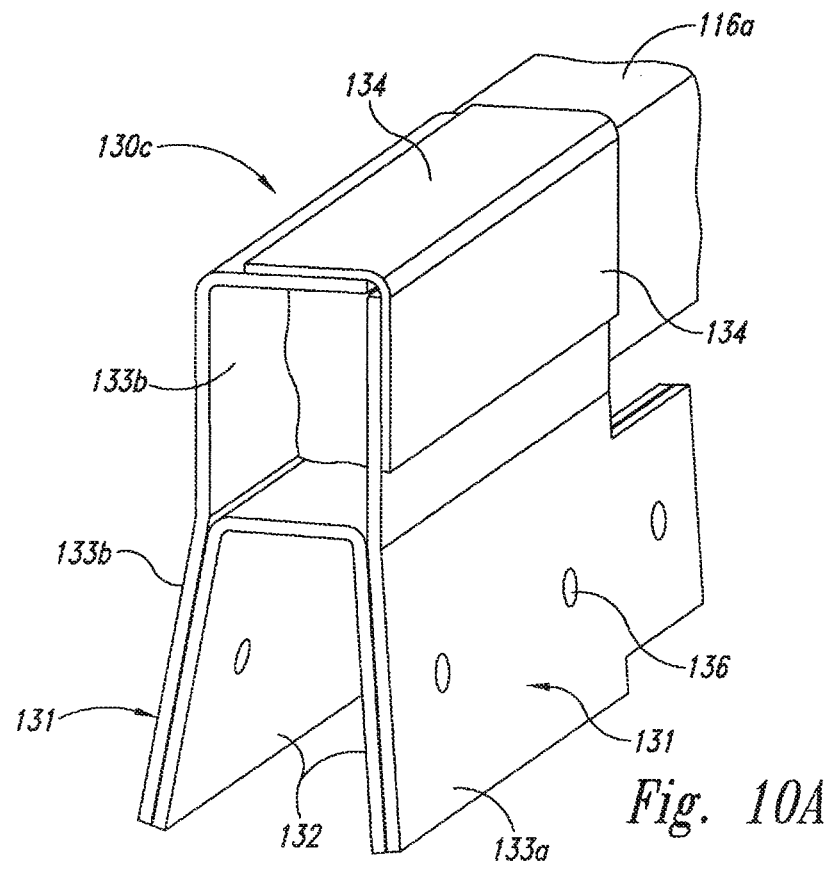
FIG. 10A is a partially schematic, isometric illustration of a truss attachment member configured in accordance with an embodiment of the disclosure.
Figure 10B:
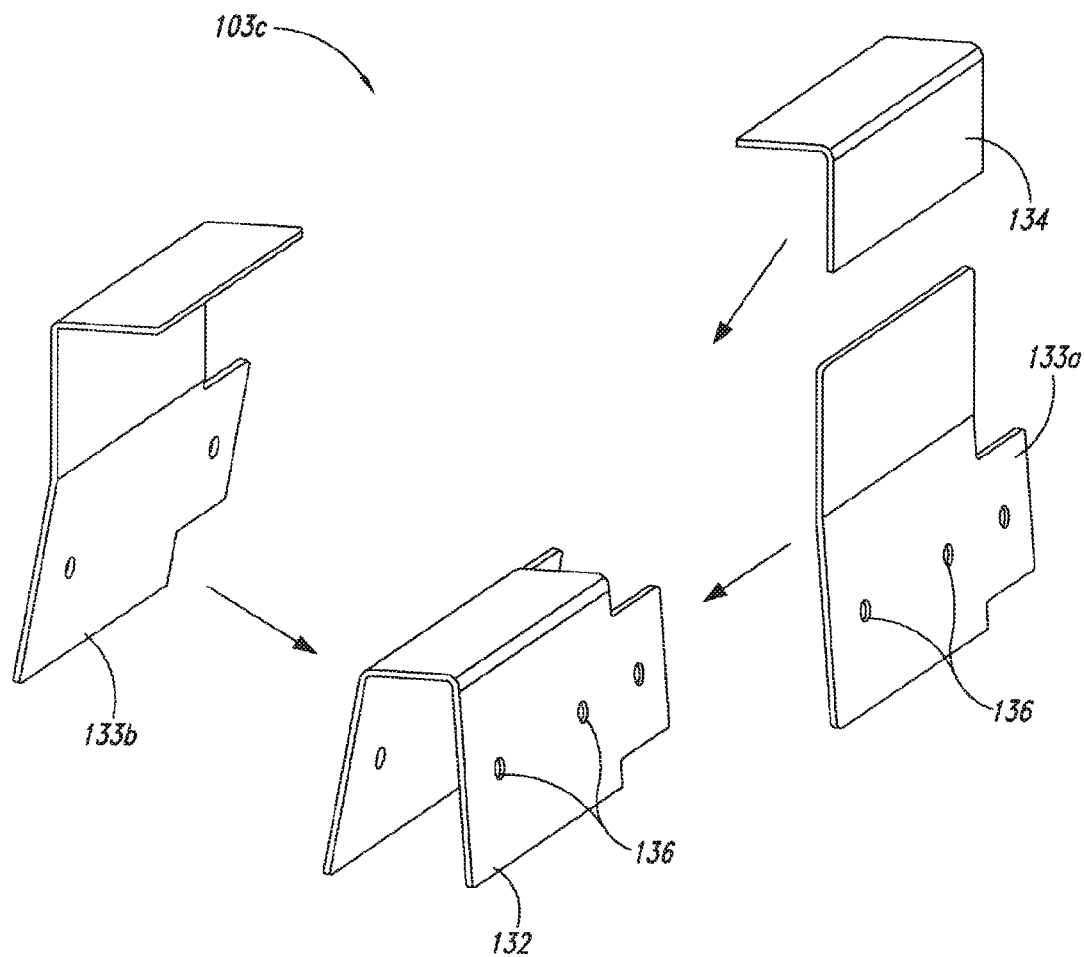
FIG. 10B is a partially schematic, exploded isometric illustration of the truss member shown in FIG. 10A.

FIG. 10A is a partially schematic, isometric illustration of a representative third truss attachment member 130c, having elements configured in accordance with an embodiment of the disclosure. FIG. 10B is an exploded view of the third truss attachment member 130c. In a particular aspect of the embodiment shown in FIGS. 10A and 10B, the elements include an inner element 132, a first outer element 133a, and a second outer element 133b. The first and second outer elements 133a, 133b, in combination with the inner element 132 form the flanges 131 to which truss members 141 (e.g., first truss members 141a shown in FIG. 9A) can be attached via attachment holes 136 or other arrangements. A cap 134 secures the opposite ends of the first and second outer elements 133a, 133b to each other, around the third spar 116c, a portion of which is shown in FIG. 10A. Neighboring elements can be attached to each other via an adhesive or other suitable attachment arrangement. By initially providing the third truss attachment member 130c in the form of four separate constituent elements shown in FIGS. 10A and 10B, the elements can be attached to each other in situ around the spar with different elements in surface-to-surface contact with different faces of the spar. For example, three of the four elements (the inner element 132 and the first and second outer elements 133a, 133b) can be in surface-to-surface contact with different faces of the spar. In a particular embodiment, the holes 136 are drilled or otherwise formed after the elements are joined to the spar. The foregoing arrangement of elements can accordingly accommodate variations in thickness, shape, curvature and/or other characteristics of the spar. The truss attachment members 130 can be attached to the spars without forming a hole, recess or other structural discontinuity in the spar, which might otherwise reduce the strength of the spar and require the spar to be made larger (and heavier) than it otherwise would be.

Figure 10C:
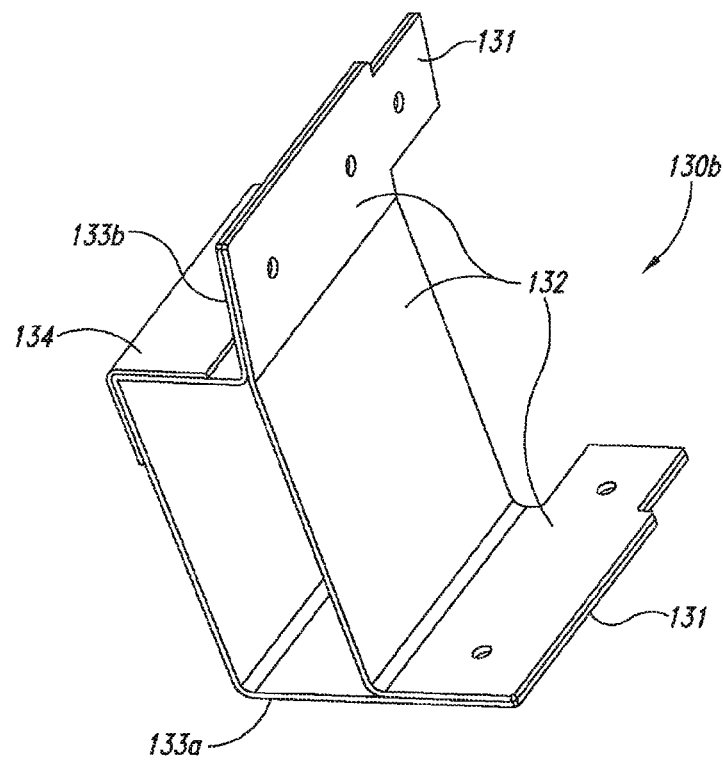
FIG. 10C is a partially schematic, isometric illustration of a truss member configured in accordance with another embodiment of the disclosure.

Other truss attachment members 130 (e.g., the first and second truss attachment members 130a, 130b shown in FIG. 9B) can have generally similar configurations. For example, FIG. 10C is a partially schematic, isometric illustration of a representative second truss attachment member 130b, that, like the third truss attachment member 130c described above, includes four initially separate elements. These elements can include an inner element 132, first and second outer elements 133a, 133b, and a cap 134. As shown in FIGS. 9B and 10A-10C, the shapes of the truss attachment members 130 and the orientation and location of the flanges 131 can be different depending upon where the truss attachment member 130 is installed.

Figure 11A:
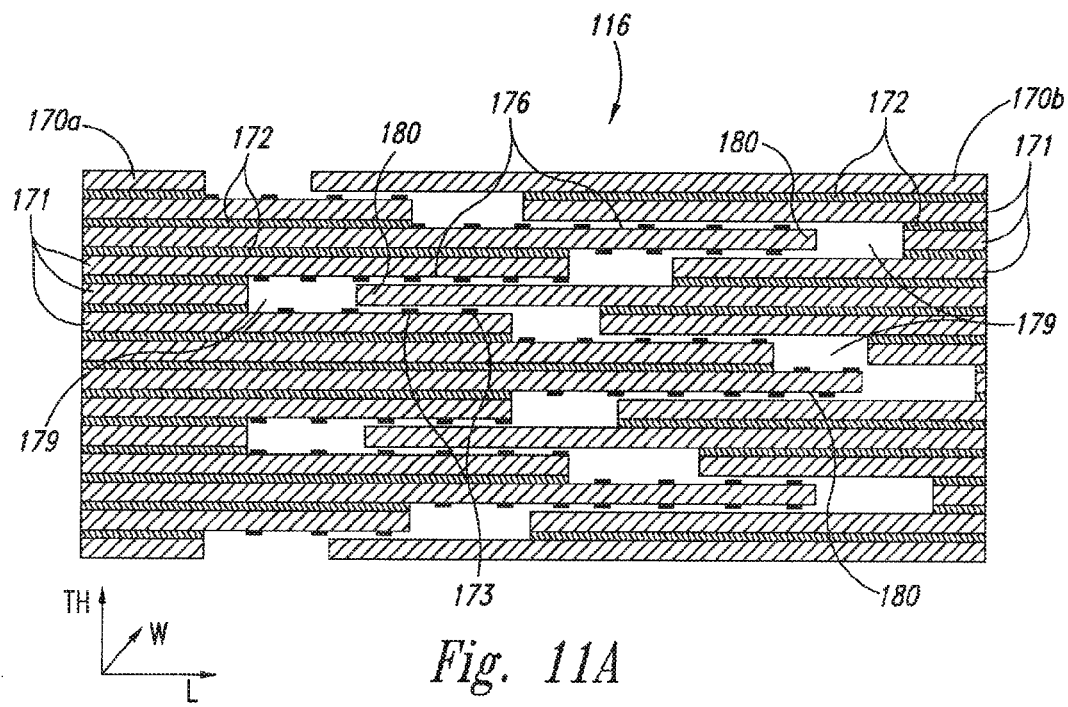
FIG. 11A illustrates two spar portions positioned for connection in accordance with an embodiment of the disclosure.

FIGS. 11A-11E illustrate representative methods for connecting portions of a spar in accordance with particular embodiments of the disclosure. For example, FIG. 11A illustrates a section of a spar 116 that includes a first spar portion 170a positioned to be joined with a second spar portion 170b. Each spar portion 170a, 170b is elongated along a longitudinal axis L, has a thickness dimension along a thickness axis TH, and extends transverse to the plane of FIG. 11A along a width axis W. Each spar portion 170a, 170b can include a stack of layers 171 (e.g., pre-cured layers) connected to each other via bonds 172. Accordingly, the bonds 172 of each spar portion 170a, 170b can be formed and cured before joining the two spar portions together. The ends of the layers 171 can be staggered so as to form recesses 179 and projections 180 that engage with corresponding projections 180 and recesses 179, respectively, of the other spar portion. The ends of the layers 171 are illustrated in FIG. 11A as blunt, but in other embodiments can be chamfered on one major surface or both major surfaces. In a particular embodiment, the projections 180 can include spaced-apart standoffs 173 that engage with the walls of the corresponding recess 179 when the two spar portion 170a, 170b are engaged with each other. The standoffs 173 can maintain an initial separation between the projections 180 in the recesses 179, allowing an adhesive to be placed in the gaps 176 between neighboring layers. This arrangement can also be used to control the thickness of an adhesive layer injected between the projections 180 and the walls of the corresponding recesses 179.

Figure 11B:
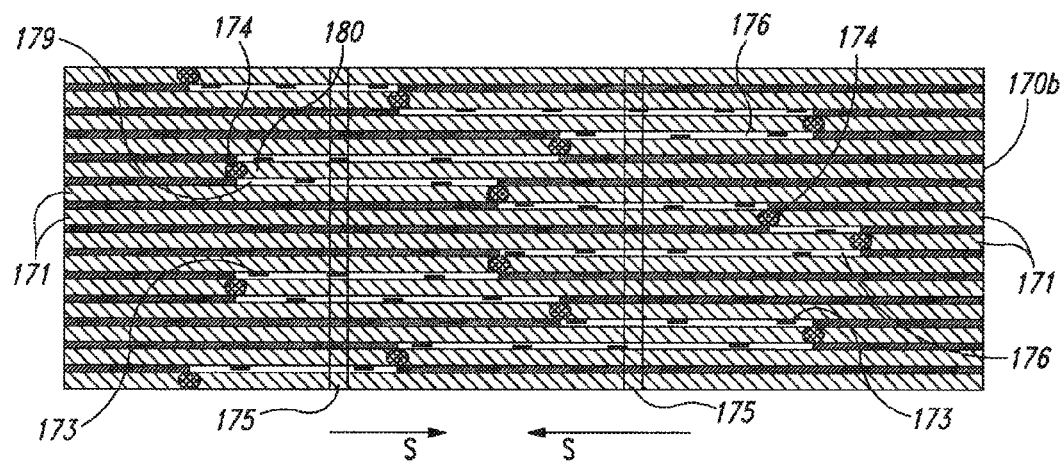
FIG. 11B illustrates the two spar portions shown in FIG. 11A clamped in accordance with an embodiment of the disclosure.

Referring next to FIG. 11B, the two spar portions 170a, 170b have been drawn toward each other as indicated by arrows S and clamped together using one more clamps 175. In this position, the standoffs 173 maintain a separation between layers 171 of the first spar portion 170a and neighboring layers 171 of the second spar portion 170b. At locations where the projection 180 of one of the spar portions 170a, 170b is proximate to the end of recess 179 of the other spar portion 170a, 170b, the operator can form an injection dam 174. The injection dam 174 can be formed using a suitable adhesive (e.g., MA530), and can extend transverse to the plane of FIG. 11B over the entire width of the spar 116. In a particular embodiment, the operator can thread an injector nozzle entirely through the recess 179 of the spar 116 to the opposite face, and inject the adhesive as the nozzle is drawn outwardly perpendicular to the plane of FIG. 11B so as to form the dam 174 along the entire width of the spar 116. The adhesive forming the dam 174 is then allowed to cure, while gaps 176 remain between neighboring layers 171. The gaps 176 accordingly extend perpendicular to the plane of FIG. 11B across the entire width of the spar 116. The entrances to the gaps 176 at the faces of the spar 116 are permanently or temporarily sealed, with the exception of vents that are located near the injection dam 174. For example, the gap entrances can be sealed with corresponding adhesive beads that are cured and remain with the spar after the gaps 176 are filled. In other embodiments, a removable plate or mask can provide this function.

Figure 11C:
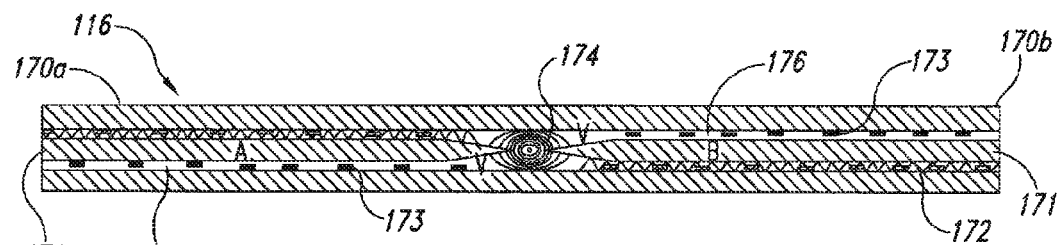
FIG. 11C illustrates an enlarged side view of three layers of the spar portions shown in FIG. 11B.

FIG. 11C is an enlarged illustration of a portion of the spar 116, illustrating a representative injection dam 174 and associated vents V. The vents V are positioned to allow air to escape from the gap 176 as the gap 176 is injected with an adhesive. One aspect of an embodiment shown in FIG. 11O is that the ends of the layers 171 have a double chamfer (e.g., both the upper and lower surfaces are chamfered or beveled). In other embodiments, the ends of the layers 171 can have different shapes, e.g., a chamfer on only the lower surface of the layer 171 of the first spar portion 170a, and a chamfer on only the upper surface of the layer 171 of the second spar portion 170b. It is expected that such an arrangement may reduce the likelihood for the chamfered tips to interfere with each other, and/or reduce interference with sonic or ultrasonic energy used to detect possible defects in the resulting joint.

Figure 11D:
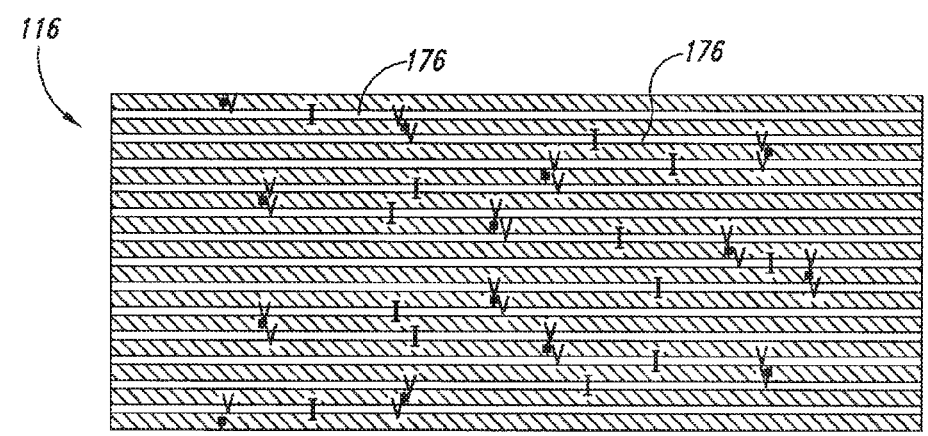
FIG. 11D illustrates representative injection sites, vent sites, and dams for the spar portions shown in FIG. 11B.

FIG. 11D illustrates the spar 116, with the vents V and injection sites I identified over the entire thickness of the spar 116. During a representative operation, an adhesive is injected at each injection site I, and air is allowed to escape from the associated gap 176 through the corresponding vents V.

Figure 11E:
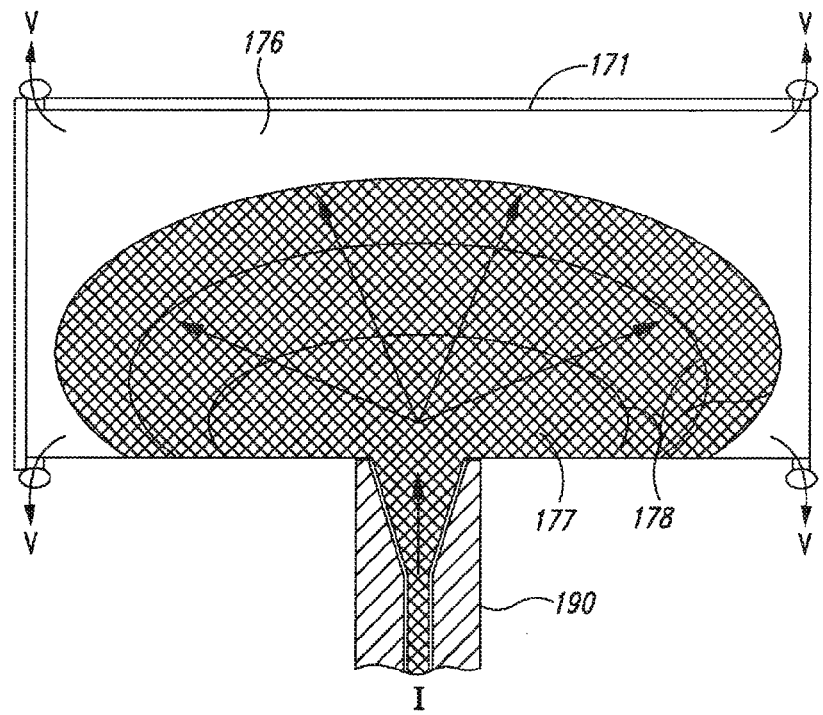
FIG. 11E is a partially schematic top view of a location between neighboring layers of the spar portion shown in FIG. 11B.

FIG. 11E is a top-down view of the gap 176 between neighboring layers 171, one of which is visible in FIG. 11E. As the operator injects an adhesive 177 at the injection site I, the adhesive 177 flows through the gap 176, as indicated by adhesive fronts 178. The adhesive 177 can have a viscosity selected to allow it to penetrate into the gaps 176, e.g., a viscosity of from about 100 centipoise to about 100,000 centipoise. In particular embodiments, the adhesive viscosity is less than 80,000 centipoise, and in other embodiments, it is less than 30,000 centipoise. The vents V allow air to escape from the gap 176 as the adhesive 177 advances. Accordingly, the entire gap 176 can be filled by the adhesive 177. The injector nozzle 190 can have a "duckbill" shape to create the wide, flat injection flow shown in FIG. 11E.

Figure 11F:
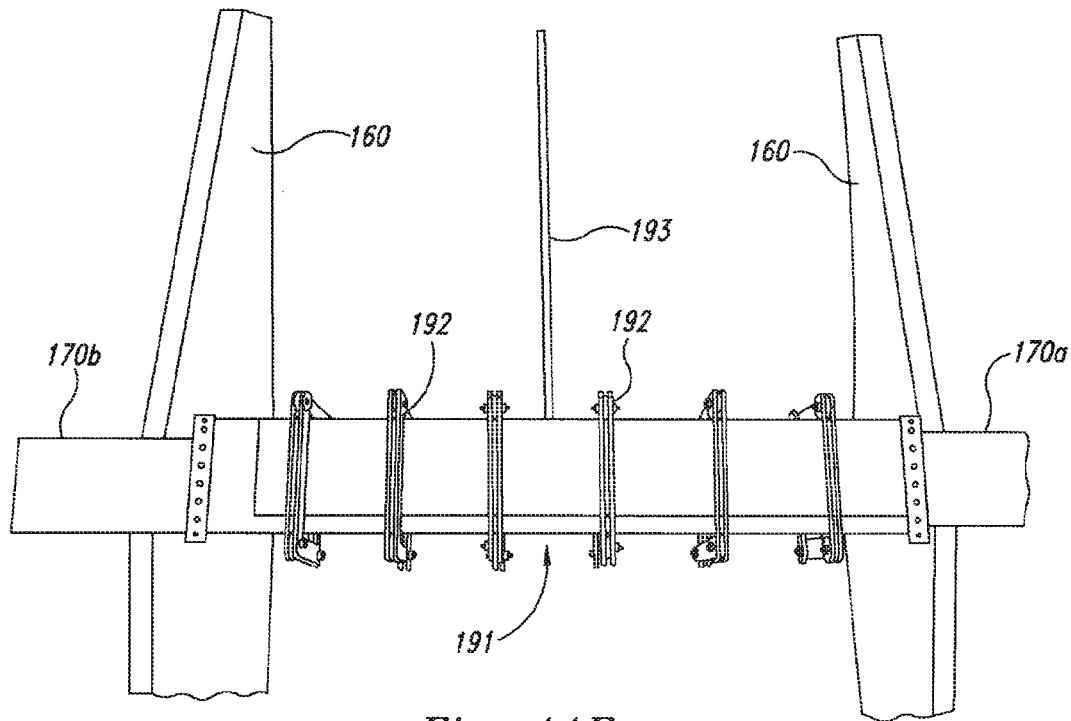
FIG. 11F is a partially schematic illustration of an arrangement for injecting adhesive to join two spar portions in accordance with another embodiment of the disclosure.

FIG. 11F is a partially schematic illustration of a manifold arrangement used to deliver adhesive to the joint region between the spar portions 170a, 170b. The spar portions 170a, 170b are connected in a region between two ribs 160. FIG. 11F is looking downwardly along the thickness axis at the tops of the spar segments 170a, 170b. The manifold 191 can include be held in place by a number clamps 192, and can be positioned against one or more caps (not visible in FIG. 11F) located at the edges and/or faces of the spar portions 170a, 170b. The caps can confine the flow of adhesive to the joint region. The manifold 191 can be fed by a supply line 193, and can include a series of "duckbill" shaped injector nozzles 190 (a representative one of which is shown schematically in FIG. 11E) arranged perpendicular to the plane of FIG. 11G to inject adhesive at multiple points in the thickness direction of the joint. For example, the manifold 191 can include a nozzle aligned with each gap 176 between neighboring layers 171 (shown in FIG. 11B).

One feature of at least some of the foregoing embodiments is that the standoffs 173 can prevent a pre-applied adhesive from being scraped off as the two spar portions 170a, 170b are brought toward each other. Such an adhesive may be pre-applied in cases for which there are a relatively small number of gaps 176 that are to be sealed simultaneously, and/or cases for which the adhesive cures slowly. In addition to or in lieu of this feature, the standoffs 173 can maintain a separation between neighboring layers 171 of the spar portions 170a, 170b to allow formation of a uniformly thick bond, whether the adhesive is pre-applied or injected after the spar portions 170a, 170b are engaged with each other. For example, the standoffs 173 can have a thickness of approximately 0.030 inches in a particular embodiment, and other dimensions in other embodiments, depending on the particular geometry of the joint. In any of the foregoing embodiments, the standoffs 173 can produce a more uniform bond between the first and second spar portions 170a, 170b, thus increasing the strength and reliability of the spar 116.

Another feature of at least some of the foregoing embodiments is that they include a truss structure at connection regions between segments of the blade, and non-truss structures over the lengths or a significant portion of the lengths of the blade segments. In particular embodiments, the blade segments connected at the connection regions have no shear load bearing truss structures. In other embodiments, the blade segments can have some shear load bearing truss structure, but the majority of the shear loads are carried by non-truss structure elements. For example, such embodiments include wind turbine blade systems for which the non-truss structure elements carry at least 50%, at least 75%, or at least 90% of the shear load in those segments. One advantage of the foregoing feature is that the components of the truss structure (e.g., extruded, high strength aluminum channels) can be relatively expensive and so limiting the use of the truss structure to particular regions of the blade can reduce the cost of the blade and therefore increase the efficiency with which energy is produced by the blade. Another advantage of this feature is that it takes advantage of the modular nature of the truss structure at a point in the blade construction process when such modularity is particularly useful, e.g., when connecting pre-fabricated blade segments in the field.

From the foregoing, it will be appreciated that specific embodiments of the disclosure have been described herein for purposes of illustration, but that various modifications may be made without deviating from the disclosure. For example, the wind turbine blade can include more than three segments or fewer than three segments in other embodiments. The internal structure of the segments at positions spaced apart from the connection regions can be different than the arrangements shown in the Figures described above. In other embodiments, the spar portions can be joined using other techniques, e.g., injecting adhesive at other locations between neighboring layers of the spar. Further embodiments are described in co-pending PCT Application US09/66875, incorporated herein by reference.

Certain aspects of the disclosure described in the context of particular embodiments may be combined or eliminated in other embodiments. For example, the spar portions may form part of a connection region without necessarily including the specific spar portion attachment arrangement shown in FIGS. 11A-11E. Further, while advantages associated with certain embodiments have been described in the context of those embodiments, other embodiments may also exhibit such advantages, and not all embodiments need necessarily exhibit such advantages to fall within the scope of the present disclosure. Accordingly, the present disclosure and associated technology can encompass other embodiments not expressly shown or described herein. The following examples provide additional embodiments of the disclosed technology.

We claim:
1. A wind turbine system, comprising:
   a wind turbine blade elongated along a longitudinal axis, the wind turbine blade including:
      a first segment having a first position along the longitudinal axis and having a first internal load-bearing structure for which non-truss structure elements carry at least 90% of the shear loads in the first segment;
a second segment having a second position along the longitudinal axis and having a second internal load-bearing structure for which non-truss structure elements carry at least 90% of the shear loads in the second segment; and
a connection region between the first and second segments, the connection region including an internal load-bearing truss structure connected between the first internal load-bearing structure and the second internal load-bearing structure.

2. The system of claim 1 wherein the first internal load-bearing structure does not include a load-bearing truss structure and wherein the second internal load-bearing structure does not include a load-bearing truss structure.

3. The system of claim 1 wherein the first internal load bearing structure includes:
a plurality of ribs positioned at spaced-apart locations along the longitudinal axis, with individual ribs extending transverse to the longitudinal axis; and
a shear web extending along the longitudinal axis and connected to the ribs.

4. The system of claim 1 wherein the first segment includes a first spar portion extending along the longitudinal axis, the second segment includes a second spar portion extending along the longitudinal axis, and wherein the first and second spar portions are joined directly to each other at the connection region.

5. The system of claim 4 wherein the first and second spar portions are joined with a finger joint that includes projections from the first spar portion received in recesses of the second spar portion.

6. The system of claim 1 wherein the truss structure includes at least one rib and a plurality of truss members connected between the at least one rib and the first and second segments, and wherein the truss members have a C-shaped cross-section.

7. The system of claim 1 wherein at least one of the first and second segments includes a plurality of longitudinally extending spars and a plurality of longitudinally spaced-apart ribs, with individual ribs attached to the longitudinally extending spars, and wherein the truss structure includes:
a plurality of truss attachment members, with individual truss attachment members connected to a spar, a rib, or both a spar and rib without the use of a hole in the respective spar, the rib or both the spar and the rib, wherein an individual truss attachment member includes at least three assemblable elements in surface-to-surface contact with the spar; and
a plurality of truss members, with individual truss members connected between corresponding pairs of truss attachment members.

8. The system of claim 1 wherein each of the first internal load bearing structure includes a first longitudinally extending shear web, the second internal load bearing structure includes a second longitudinally extending shear web, and wherein the first and second longitudinally extending shear webs are discontinuous relative to each other at the connection region.

9. The system of claim 8 wherein the first and second shear webs are discontinuous relative to each along the longitudinal axis, and are generally aligned with each other in a thickness direction transverse to the longitudinal axis and in a chordwise direction transverse to the longitudinal axis.

10. The system of claim 8, further comprising a third longitudinally extending shear web positioned between the first and second longitudinally extending shear webs, and being discontinuous with the first and second longitudinally extending shear webs.

11. A wind turbine system, comprising:
a wind turbine blade elongated along a longitudinal axis, the wind turbine blade including:
a first segment having a first position along the longitudinal axis and having a first internal load-bearing structure for which non-truss structure elements carry at least 90% of the shear loads in the first segment, the first segment including a first longitudinally extending shear web, a plurality of first longitudinally extending spars and a plurality of first longitudinally spaced-apart ribs, with individual first ribs attached to individual first spars;
a second segment having a second position along the longitudinal axis and having a second internal load-bearing structure for which non-truss structure elements carry at least 90% of the shear loads in the second segment, the second segment including a second longitudinally extending shear web, a plurality of second longitudinally extending spars and a plurality of second longitudinally spaced-apart ribs, with individual second ribs attached to individual second spars; and
a connection region between the first and second segments, the connection region including an internal load-bearing truss structure connected between the first internal load-bearing structure and the second internal load-bearing structure, the connection region including:
a plurality of truss attachment members, with individual truss attachment members connected to a spar, a rib, or both a spar and rib without the use of a hole in the respective spar, the rib or both the spar and the rib, wherein an individual truss attachment member includes at least three assemblable elements in surface-to-surface contact with the spar; and
a plurality of truss members, with individual truss members connected between corresponding pairs of truss attachment members.

12. The system of claim 11 wherein the first and second shear webs are discontinuous relative to each along the longitudinal axis, and are generally aligned with each other in a thickness direction transverse to the longitudinal axis and in a chordwise direction transverse to the longitudinal axis.

13. The system of claim 11, further comprising a third longitudinally extending shear web positioned between the first and second longitudinally extending shear web, and being discontinuous with the first and second extending shear webs.

14. A wind turbine system, comprising:
a wind turbine blade including:
a plurality of longitudinally extending spars;
a plurality of longitudinally spaced-apart ribs, with individual ribs attached to the longitudinally extending spars;
a plurality of truss attachment members, with individual truss attachment members connected to a spar, a rib, or both a spar and rib without the use of a hole in the respective spar, the rib or both the spar and the rib, wherein an individual truss attachment member includes at least three assemblable elements in surface-to-surface contact with the spar; and a plurality of truss members, with individual truss members connected between corresponding pairs of truss attachment members.

15. The system of claim 14 wherein an individual truss attachment member includes a first element extending circumferentially around a first portion of the spar and in surface-to-surface contact with the first portion of the spar, a second element extending circumferentially around a second portion of the spar and in surface-to-surface contact with the second portion of the spar, a third element extending circumferentially around a third portion of the spar and in surface-to-surface contact with the third portion of the spar, the first, second and third elements connected to each other around the spar.

16. The system of claim 15, further comprising a fourth element positioned around and at least partially enclosing at least two of the first, second and third elements.

17. The system of claim 14 wherein an individual truss attachment member is formed from a metal and the spar is formed from a composite material.

18. The system of claim 14 wherein the spar and the truss attachment member are adhesively bonded.

19. The system of claim 14 wherein two of the elements together form a flange, and wherein at least one of the truss members is attached to the flange.

* * * * *